United States Patent [19]

Waraksa et al.

[11] Patent Number: 5,515,036
[45] Date of Patent: May 7, 1996

[54] PASSIVE KEYLESS ENTRY SYSTEM

[75] Inventors: Thomas J. Waraksa, Clarkston; Keith D. Fraley, Drayton Plains, both of Mich.; Richard E. Kiefer, Boulder, Colo.; Daniel G. Douglas, Louisville, Colo.; Lee H. Gilbert, Boulder, Colo.

[73] Assignee: Lectron Products, Inc., Rochester Hills, Mich.

[21] Appl. No.: 378,945

[22] Filed: Jan. 26, 1995

Related U.S. Application Data

[63] Continuation of Ser. No. 164,055, Dec. 8, 1993, abandoned, which is a continuation of Ser. No. 513,900, Apr. 24, 1990, Pat. No. 5,319,364, which is a division of Ser. No. 199,476, May 27, 1988, Pat. No. 4,942,393.

[51] Int. Cl.⁶ .................................................. G08C 19/00
[52] U.S. Cl. .................................. 340/825.720; 455/127
[58] Field of Search .................. 340/825.69, 825.72, 340/825.31, 457; 307/10.1, 10.2, 10.5; 361/172; 235/382.5; 375/114, 116; 370/18, 107, 118; 455/127

[56] References Cited

U.S. PATENT DOCUMENTS

| | | | |
|---|---|---|---|
| 3,176,229 | 3/1965 | Pierce | 455/127 |
| 3,299,356 | 1/1967 | Bornhorst et al. | 455/127 |
| 3,760,422 | 9/1973 | Zimmer et al. | 340/825.69 |
| 3,928,805 | 12/1975 | MacTaggart | 455/127 |
| 4,580,136 | 4/1986 | Kitamura et al. | 340/825.69 |
| 4,767,999 | 8/1988 | VerPlanck | 331/166 |
| 4,788,542 | 11/1988 | Tanabe | 340/825.69 |
| 4,890,286 | 12/1989 | Hirose | 371/37.8 |
| 5,319,364 | 6/1994 | Waraksa et al. | 340/825.31 |

OTHER PUBLICATIONS

Stremler; Introduction to Communication Systems, 2nd ed. 1982; pp. 319–320.

Lathi; Modern Digital and Analog Communication Systems; 1983; pp. 257, 285, 314–317.

*Primary Examiner*—Michael Horabik
*Attorney, Agent, or Firm*—Harness, Dickey & Pierce

[57] ABSTRACT

A passive keyless entry system that is specifically adapted for use with automotive vehicles is designed to automatically unlock the vehicle as the operator approaches the vehicle. The system is further designed to automatically lock the vehicle as the operator, carrying the beacon, moves away from the vehicle. The system includes a portable beacon that is carried by the operator, a receiver/controller located in the vehicle, and an antenna connected to the receiver/controller for receiving the encoded transmission from the beacon. The beacon includes a motion sensor to conserve battery life when the beacon is stationary. Transmission between the beacon and the receiver/controller is characterized by a magnetically coupled radio frequency signal embodying differential phase encoded data with error correction coding of the data to enhance noise immunity and signal discrimination.

11 Claims, 15 Drawing Sheets

Bipolar Drive

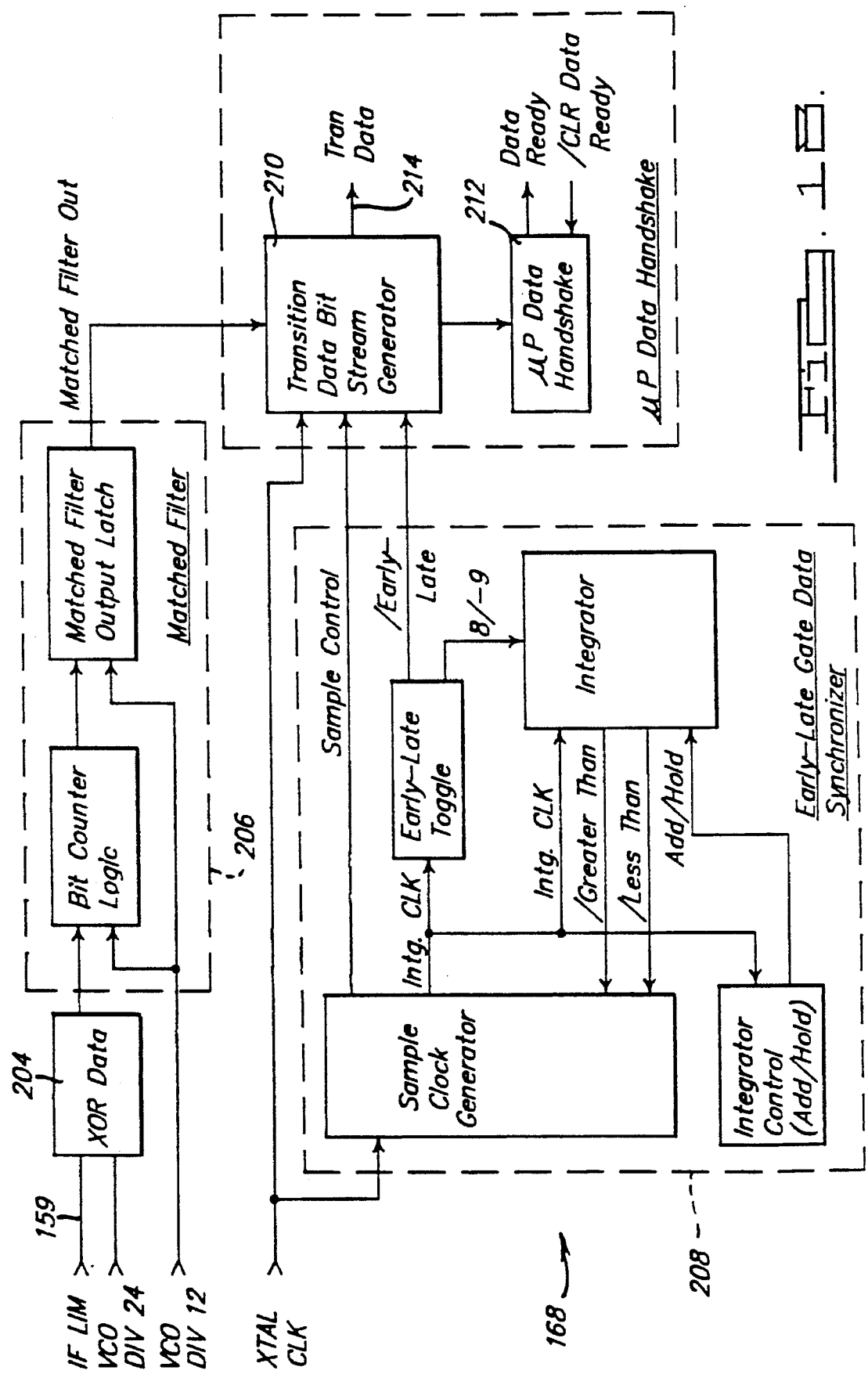

PASSIVE KEYLESS ENTRY SYSTEM

This is a continuation of U.S. patent application Ser. No. 08/164,055, filed Dec. 8, 1993 now abandoned, which is a continuation of U.S. patent application Ser. No. 07/513,900, filed Apr. 24, 1990, now U.S. Pat. No. 5,319,364, which is a division of U.S. patent application Ser. No. 199,476, filed May 27, 1988, now U.S. Pat. No. 4,942,393.

BACKGROUND AND SUMMARY OF THE INVENTION

The present invention relates to electronic keyless entry systems and in particular to a passive keyless entry system that is particularly adapted for use with automotive vehicles.

Automotive keyless entry systems, when first introduced, typically included a numerical keypad located on the exterior door panel of the vehicle. The operator entered a unique multiple digit code on the keypad to automatically unlock or lock the vehicle. Recently, more sophisticated keyless entry systems for vehicles have been proposed which use a portable remote transmitter that is carried by the operator and a receiver located in the vehicle that is adapted to unlock the vehicle in response to the detection of a coded radio frequency signal or a coded optical signal received from the transmitter. Such systems require that the operator actuate a button or switch on the transmitter to initiate the transmission, similar to the operation of a conventional automatic garage door opener, in order to conserve battery life and prevent inadvertent actuation.

While more convenient to operate than the keypad-type keyless entry systems, the latter transmitter/receiver-type systems nonetheless require that the operator physically locate the transmitter and actuate a button to unlock the vehicle. Hence, the convenience provided by such a system versus a conventional key and lock arrangement is not substantially improved.

In addition, while other types of "keyless" entry systems are known and presently used in other applications, these systems for various reasons are generally not suitable for automotive use. This would include systems employing magnetic card readers, interrogation/transponder-type systems, and conventional automatic garage door openers. A magnetic card-type system is probably adaptable to automotive use, but provides little added benefit to justify the expense. Interrogator/transponder-type systems, though adaptable to operate in a totally passive manner, are more complex and therefore more expensive, and present a power consumption problem as the interrogator therefore must be on and interrogating at all times. In addition, the transponder in such systems must be capable of receiving as well as transmitting data, thus adding to cost. Lastly, automatic garage door systems, while appearing to employ similar technology have substantially different operating requirements which result in significantly different circuit designs. In particular, an automotive keyless entry system must possess a level of noise immunity and signal discrimination that is substantially greater than that required for an automatic garage door opener. This is due to several factors including the many different environments in which vehicles may be located, the greater number of vehicles that may be equipped with comparable systems, and the fact that large numbers of vehicles are frequently located within close proximity to one another, such as in parking lots. In addition, automatic garage door systems require that the operator actuate a transmitter, and therefore are not totally passive.

Also, garage door opener-type systems have a substantial range and therefore can potentially activate a function, such as unlocking the trunk of the vehicle, when the operator is some distance away from the vehicle and unaware the trunk has been opened.

Accordingly, it is the primary object of the present invention to provide a totally passive keyless entry system that is especially adapted for use with automotive vehicles.

It is also an object of the present invention to provide an automotive keyless entry system that is adapted to automatically unlock the vehicle as the operator approaches the vehicle.

In addition, it is an object of the present invention to provide a passive keyless entry system having a beacon/transmitter that is extremely small in size and includes a motion sensing switch that automatically activates the transmitter in the beacon whenever movement of the beacon is sensed.

It is a further object of the present invention to provide a passive keyless entry system that employs electronic circuitry which permits the system to function in the micropower range while in its quiescent state.

Additionally, it is an object of the present invention to provide a passive keyless entry system having an acceptable operating range between the beacon and receiver while providing a projected beacon battery life in excess of one year.

Further, it is an object of the present invention to provide a passive keyless entry system that employs signal transmission and coding techniques which provide a high level of noise immunity and signal discrimination.

It is also an object of the present invention to provide a passive keyless entry system that is reliable and yet is relatively inexpensive to manufacture.

In general, the passive keyless entry system according to the present invention comprises three basic components: a transmitter or beacon, a receiver/controller, and a receiving antenna. The beacon, which is small enough to be attached to a keychain, is carried by the operator and incorporates a motion sensor that is used to energize the transmitter portion of the beacon. The transmitter in the beacon is adapted to emit a coded radio frequency signal that contains both identification and function information and an error correction code. The beacon is designed to continue to transmit repeatedly its coded signal until no motion is detected for a predetermined period of time. Thus, the motion sensor serves to promote beacon battery life and enables the present system to function in a totally passive manner.

The receiving antenna comprises a simple coil of wire, wound to be sensitive at the transmitted frequency of the beacon. The antenna is located at a position on the vehicle to optimize the performance of the system. It has been found desirable to adapt the system so that the receiver/controller is responsive to the signal from the beacon when the beacon comes within 3–6 feet of the vehicle.

The receiver/controller is mounted inside the vehicle and is adapted to operate on the vehicle's 12 volt negative ground battery. Upon receipt of a radio frequency signal from the antenna, the receiver/controller is adapted to process the coded radio frequency signal and evaluate the serial data contained therein. If the signal is determined to be valid, the receiver/controller automatically unlocks the driver's-side vehicle door.

Optionally, the beacon may be provided with function switches which, when depressed by the operator, change the function code contained in the radio frequency signal, thus directing the receiver/controller to open the vehicle trunk and/or perform other functions. In addition, the receiver/controller in the present system is adapted to automatically lock the vehicle doors when the operator leaves the vehicle and carries the beacon out of range of the receiver/controller, assuming the proper status of the ignition and doorjamb switches.

Additional objects and advantages of the present invention will become apparent upon reading the following description of the preferred embodiment of the present invention which makes reference to the drawings in which:

BRIEF DESCRIPTION OF THE DRAWINGS

FIG. 18 is a detailed block diagram of the data extraction circuit shown in FIG. 14.

DETAILED DESCRIPTION OF THE PREFERRED EMBODIMENT

Figure 1:
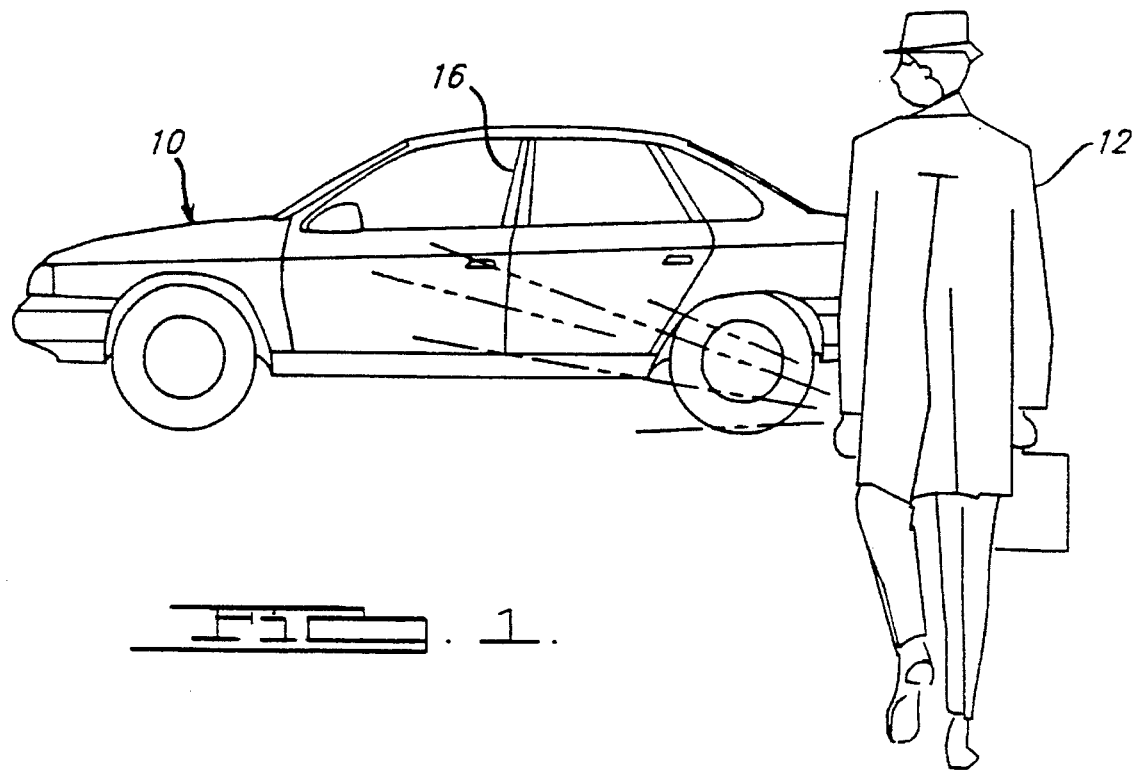
FIG. 1 is a diagrammatical view illustrating the preferred application of the present invention.

Referring to FIG. 1, a diagrammatic view illustrating the application of the present invention as an entry system for an automobile 10 is shown. As depicted in the drawing, the beacon (concealed) is adapted to be carried by the driver 12 and is responsive to the motion created as the driver walks to energize the transmitter portion of the beacon. While energized, the transmitter portion of the beacon continuously transmits a coded radio frequency signal which includes identification and function data, and an error correction code. When the driver comes within range of the vehicle-approximately three feet in the preferred embodiment-the receiving antenna (also concealed) located on the vehicle magnetically couples the transmitted beacon energy into the receiver/controller. The antenna 14 (FIG. 2) in the preferred embodiment is located in the B-pillar 16 of the vehicle as this location has been experimentally determined to produce the most favorable results. However, other locations on the vehicle have been found to be acceptable. Moreover, in view of the magnetic coupling between the beacon and receiver, it is possible to control the field of the antenna by appropriate placement, orientation, and configuration of the antenna, and in this manner provide coverage in selected areas, such as in the vicinity of the trunk lid or the driver-side door handle.

The receiver/controller, which is located in the vehicle, is adapted to process the coded radio frequency signal received from the antenna and perform the function requested if the identification code is determined to be "valid", where a "valid" code corresponds to the code prestored in the receiver/controller. Optionally, the beacon may be provided with one or more input switches that can be used to transmit up to sixteen different function codes to control various functions in addition to unlocking the driver's side door, such as unlocking the trunk, turning on the interior lights, etc. Preferably, however, when none of the function switches are depressed, the receiver/controller is adapted to interpret the default function code as a command for unlocking the driver's side door of the vehicle. Alternatively, the "default" function of the system can be selected to unlock all doors of the vehicle, or any other function desired by the automobile manufacturer. In addition, the system is adapted to respond to the condition where the driver leaves the vehicle by automatically locking all doors of the vehicle a predetermined period of time after the beacon signal becomes too weak to receive.

Figure 2:
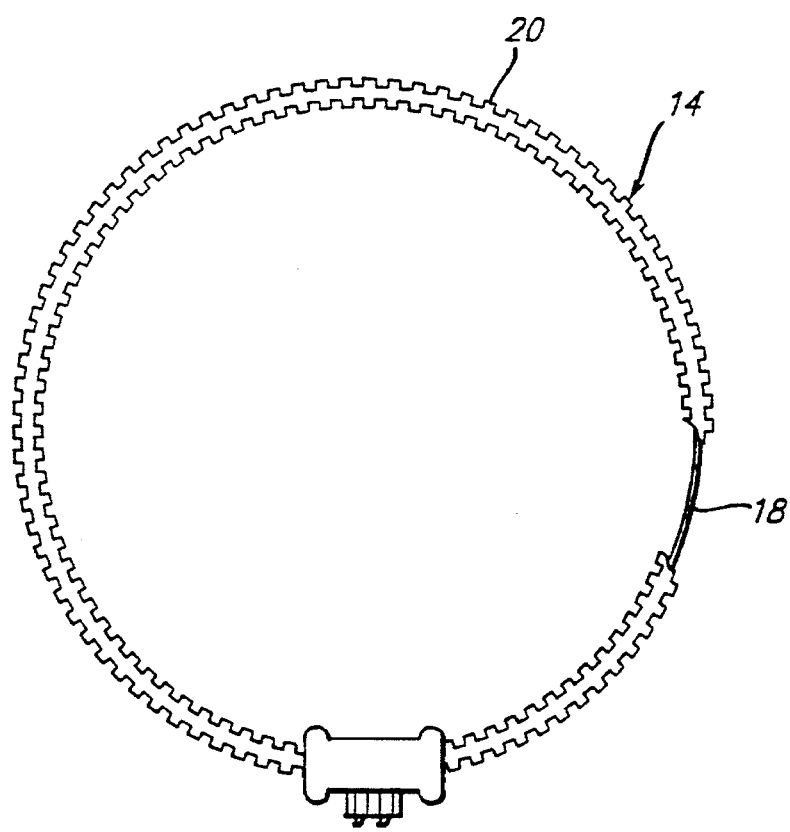
FIG. 2 is a partial cutaway view of the receiving antenna used in the present invention.

Turning to FIG. 2, a partial cutaway view of the receiving antenna 14 used in the preferred embodiment is shown. The antenna 14 merely comprises a single wire, such as 34-gauge magnet wire, that is wrapped as shown at 18 the number of turns required to provide the desired inductance. Preferably, the magnet wire is wrapped around a stable form to maintain the shape of the antenna rigid so that the inductance of the antenna does not vary. A plastic shield 20 may be placed over the coil of wire 18 for protection. Although the drawing shows the antenna as having a circular shape, other configurations can be used (e.g., rectangular) to accommodate space constraints at the desired mounting location. In addition, it may be desirable to add a second grounded wire to the coil for electrical shielding purposes to improve the performance of the antenna. However, this also adds to the cost of the antenna.

Communication Channel

In order to conserve the battery power of the beacon and the vehicle battery, the transmission frequency in the preferred embodiment is selected to be a relatively low 98.3 KHz. The frequency of the transmission signal is therefore substantially above most of the low frequency noise that emanates from an automobile and yet the fifth harmonic of the transmission frequency is still below the AM radio band. Accordingly, interference with AM radio frequency signals is avoided. The beacon antenna comprises a coil of wire as described that is tuned to the selected carrier frequency. The antenna creates a magnetic field which couples to the coil of wire used for the receiving antenna. The change in flux caused by the receipt of a signal at the carrier frequency generates a voltage across the receiving antenna terminals. When the beacon is placed in the center of the receiving antenna, the resulting voltage can be as high as 2 volts peak-to-peak. However, as the beacon moves a few feet away from the center of the receiving antenna, the voltage may drop to less than 15 microvolts peak-to-peak. This wide variation in signal level comprises one of the major constraints in the selection of appropriate communication channel architecture.

Although many different types of carrier modulation schemes may be employed, including frequency shift keying, amplitude shift keying, etc., phase shift keying ("PSK") has been selected for the preferred embodiment. In PSK encoding, the frequency stays the same, but the phase is shifted exactly 180 degrees to differentiate a logical "1" from a logical "0". This scheme uses a minimum bandwidth, and is very simple to implement in the transmitter. In particular, PSK encoding may be accomplished using an exclusive-OR gate with the carrier frequency supplied to one input and the data signal provided to the other. An additional benefit of PSK encoding is energy efficiency. Specifically, PSK encoding uses all of the transmitted energy for information with no energy being separately applied to generate a carrier. Moreover, front end signal processing of PSK encoding can be accomplished at the receiver using a limiter instead of an automatic gain control circuit. Hence, since PSK encoding is defined in terms of phase, the received signal will not suffer when passed through a limiter. The primary disadvantage of PSK encoding, on the other hand, is the need to regenerate the carrier at the receiver and thus properly synchronize the receiver to the coded transmitted signal.

Error Correction Code

While the use of many different coding schemes is possible, the preferred embodiment of the present keyless entry system uses a coding scheme that employs an error correction code to improve system performance. Specifically, the use of an error correction code allows the system to properly receive a coded transmission which may have been partially altered by noise. This improves reception performance and the response time of the system. In addition, the use of error correction codes results in a reduction of false detections. A false detection occurs any time the receiver/controller indicates the detection of a valid beacon key code when the valid code was not transmitted. This can occur due to random noise, or the presence of another beacon with a similar code that is incorrectly decoded into a valid code.

The coding scheme used in the preferred embodiment comprises a 48-bit code with two repetitions. The first four bits in the coded transmission comprise preselected synchronization bits which produce eight transitions that are illegal under the Miller code. The four SYNC bits are followed by a 4-bit FUNCTION code and a 20-bit IDENTIFICATION code. A 24-bit error correction code ("ECC") is then added to the 24 bits of FUNCTION and IDENTIFICATION code. The 4-bit FUNCTION code, as previously noted, provides up to sixteen different FUNCTION codes to selectively control the activation of additional functions as desired, such as trunk unlock, unlock all doors, turn on interior lights, etc. In addition, it will be appreciated that the 20-bit IDENTIFICATION code provides in excess of one million different ID codes, thereby significantly reducing the probability that two beacons with the same ID code will be present in the same vicinity at the same time.

In that the SYNC bit pattern is the only mechanism that the receiver/controller has to synchronize onto the data for the purposes of Miller decoding and extraction of the data bits, it is possible for noise to generate a pattern which will cause the receiver/controller to begin to read a code word at the wrong place. Moreover, it is the nature of cyclic codes that any shifted version of a legal code word is itself a legal code word. The improperly synchronized code word could, therefore, become a valid code word for another vehicle and thus cause an improper unlocking of a door or activation of another function. To overcome this problem, the coding scheme in the preferred embodiment employs an anti-slip pattern that is superimposed onto the 48-bit code word making an improperly synchronized code word invalid on other vehicles. Specifically, the 48-bit FUNCTION, IDENTIFICATION, and ECC code word is exclusive-OR'ed with a predetermined 48-bit anti-slip pattern. The resulting output from the exclusive-OR gate is then provided to a Miller encoder which produces the final encoded transmitted word.

The reason for employing the Miller encoding technique is as follows. One of the characteristics of PSK encoding is the ambiguity at the receiver. This occurs because of the exact 180 degree phase the shift. Since the signal received for a digital "1" is essentially the negative of the signal transmitted for a digital "0", it is impossible to distinguish one from the other without some prior knowledge. This problem is effectively eliminated by using an edge sensitive data encoding scheme such as Miller encoding which has been selected for the present keyless entry system. In Miller encoding, when a logical "1" is transmitted, a transition always occurs in the middle of the bit cell. When a logical "0" is transmitted, a transition occurs at the beginning of the bit cell only if the previously transmitted bit was also a logical "0". Otherwise, no transition occurs. Miller encoding is utilized in the preferred embodiment because it is relatively simple to implement at both the transmitter and receiver/controller.

Miller encoding is defined by the following table:

| $D_{n-1}$ | $D_n$ | $TD_{2n}$ | $TD_{2n+1}$ |
|---|---|---|---|
| 0 | 0 | 1 | 0 |
| 0 | 1 | 0 | 1 |
| 1 | 0 | 0 | 0 |
| 1 | 1 | 0 | 1 | where n is an integer 0. . last n.

$D_{n-1}$ is the previously transmitted data bit. When n=0, $D_{n-1}$ is defined to be 1.

$D_n$ is the current data bit.

$TD_{2n}$ is the first of two transition bits for each data bit.

where 1 indicates a change in the state of the encoded data signal, and 0 indicates no change.

$TD_{2n+1}$ is the second of two transition bits for each data bit.

where 1 indicates a change in the state of the encoded data signal, and 0 indicates no change.

Figure 3:
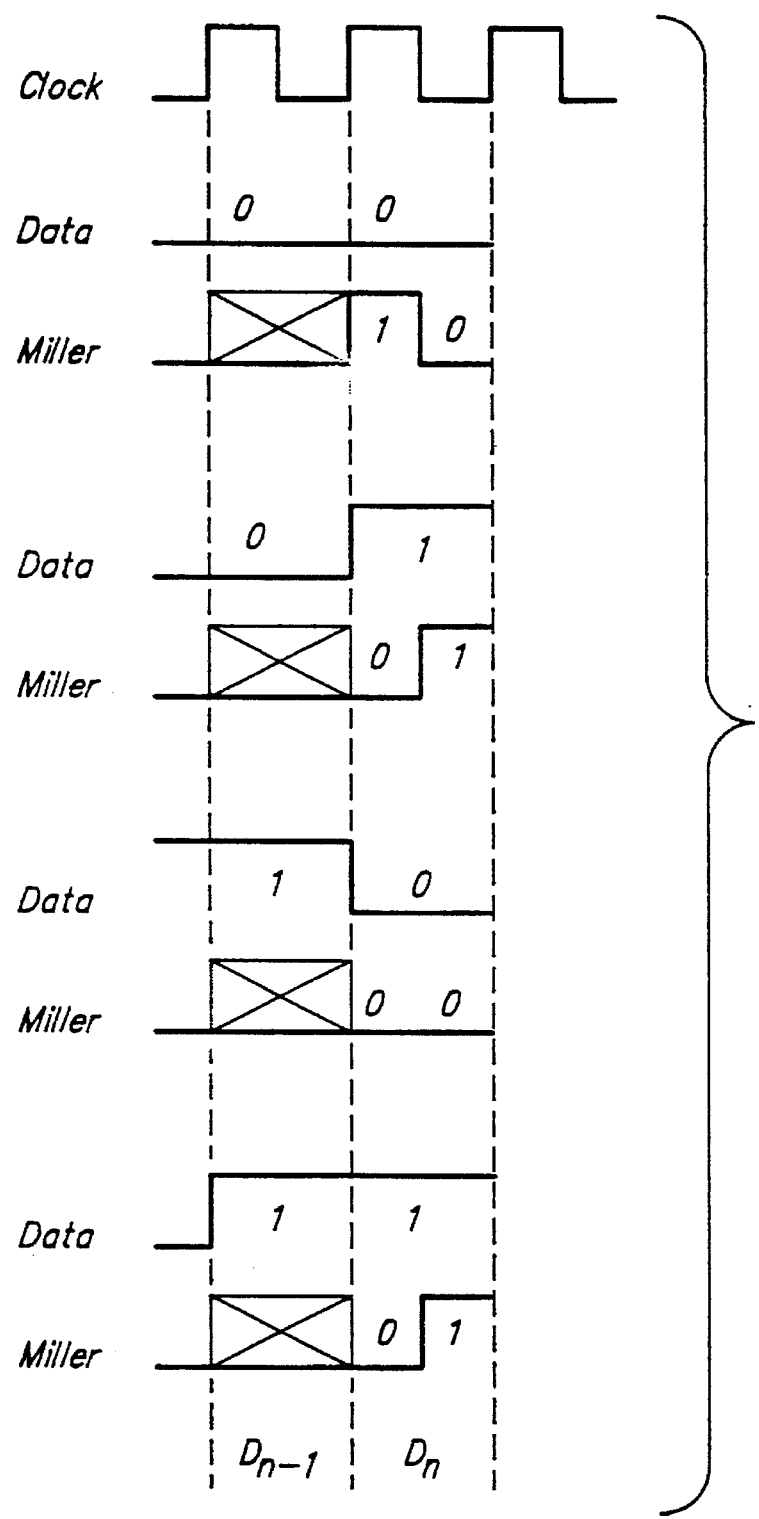
FIG. 3 is a timing diagram illustrating the Miller encoding technique used in the preferred embodiment.

The Miller encoding table is illustrated for convenient reference in FIG. 3.

As previously noted, it is necessary for the receiver to identify the beginning of the encoded transmission word and for this purpose a 4-bit SYNC pattern is added at the beginning of the code word which presents an illegal pattern for Miller encoding. Because of this illegal nature of the SYNC pattern, it can always be differentiated by the receiver from the code word. The SYNC pattern used in the preferred embodiment is defined by the transition string: 01000001, where "1" indicates a change in the state of the encoded data signal and "0" indicates no change.

In addition, it will be recognized that the receiver/controller must separate the signal coming through the data channel into individual bits. Since the bits are separated in time, this requires a clock. The preferred solution to this problem is a self-clocking code. A self-clocking code is characterized by a reasonable number of transitions that are well-defined with respect to the data bits. It will be appreciated, therefore, that since Miller encoding ensures the presence in the transmitted encoded word of a reasonable number of transitions, the use of Miller encoding also satisfies the requirement for a self-clocking code.

Beacon/Transmitter

Figure 4:
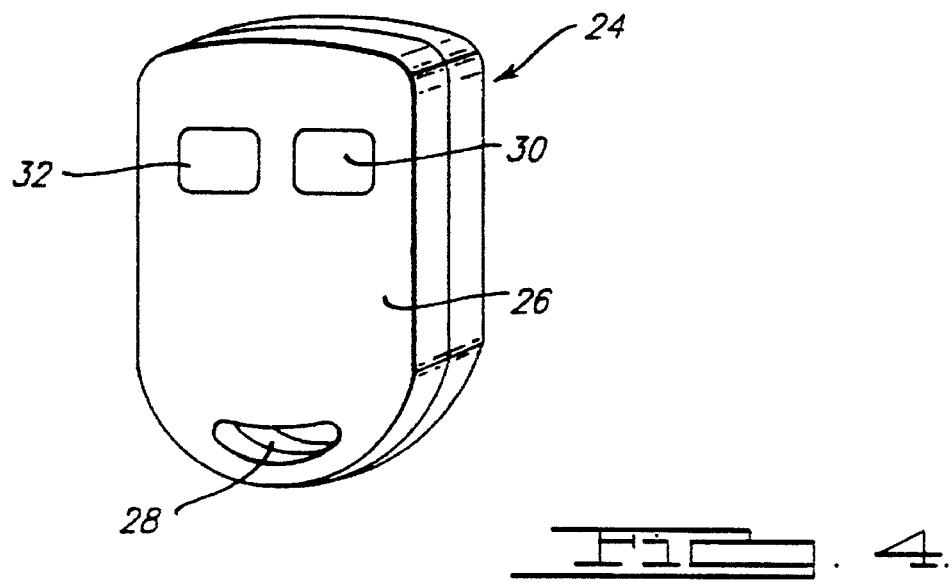
FIG. 4 is a perspective view of the beacon/transmitter of the present invention.

Turning now to FIG. 4, a perspective view of the beacon/transmitter 24 according to the present invention is shown. In the preferred embodiment, the beacon is packaged in a relatively small, generally rectangular housing 26 approximately 2 inches by 1.5 inches by 0.5 inches in size and having an opening 28 for conveniently attaching the beacon to a keychain. The beacon 24 illustrated in FIG. 4 includes two manually actuable switches 30 and 32 that are operative to unlock the trunk of the vehicle and unlock the passenger doors. As previously indicated, the beacon may alternatively be provided with additional function switches to control the selective activation of additional functions, such as turning on the interior lights of the vehicle. As also previously noted, in the default mode where none of the function switches are depressed, the beacon is adapted to transmit the "unlock driver's-side door" function code.

Figure 5:
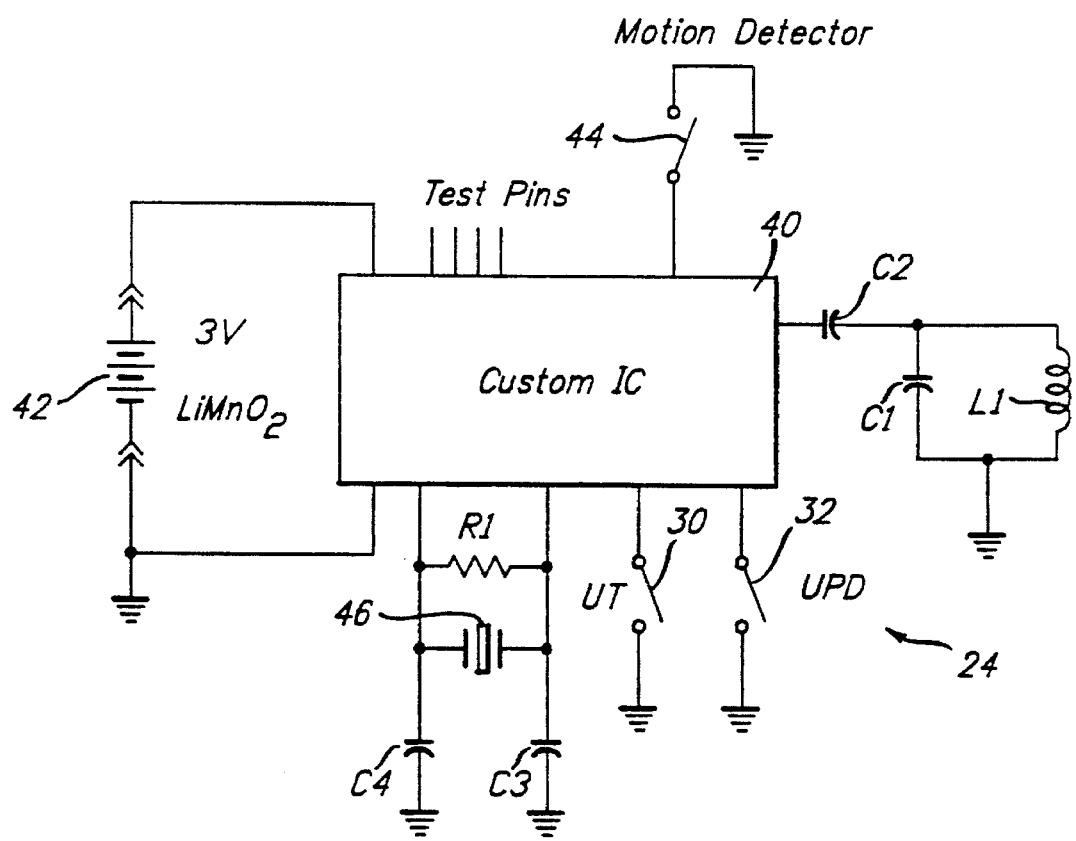
FIG. 5 is a circuit diagram of the beacon/transmitter shown in FIG. 4.

Referring now to FIG. 5, a circuit diagram of the beacon/transmitter 24 according to the present invention is shown. In the preferred embodiment, the beacon circuit is comprised of a single custom integrated circuit 40, a battery 42, a coil of wire acting as a transmitting antenna L1, a motion detector 44, a quartz crystal 46, and the two function switches 30 and 32, all mounted to a printed circuit board. The battery 42 utilized in the preferred embodiment is a conventional 3 volt lithium manganese dioxide watch battery. Similarly, the quartz crystal 46 used in the preferred embodiment comprises a conventional 32.768 KHz watch crystal that is used to control the operating frequency of the beacon. In particular, the energy contained in the third harmonic of the crystal frequency signal is used in the antenna driver. The beacon antenna L1 consists of a coil of wire and a tuning capacitor C1, the values of which are tuned to the third harmonic, 98.304 KHz. The motion detector 44 is a device that is responsive to very slight movements and is adapted to continuously cycle on and off when movement is sensed. In addition, the preferred motion detector is equally sensitive to motion in any orientation of the beacon. A motion detector suitable for use in the present application is disclosed in U.S. Pat. No. 4,942,393, assigned to the assignee of the present application.

Figure 6:
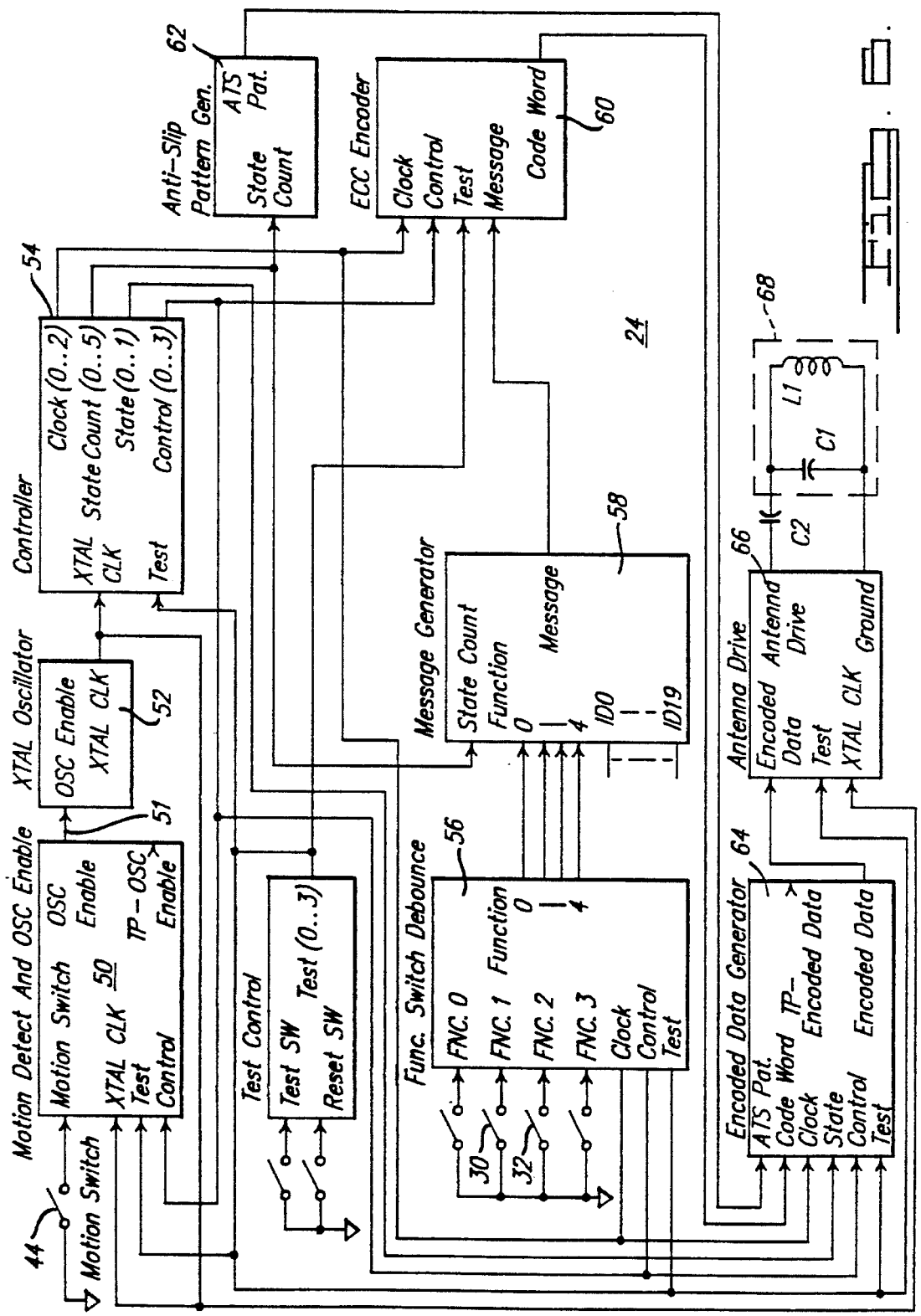
FIG. 6 is a block diagram of the beacon/transmitter shown in FIG. 5.

A block diagram of the beacon/transmitter 24 according to the present invention is illustrated in FIG. 6. The signal from the motion sensing switch 44 is provided to a motion detector and oscillator enable circuit 50. This interface circuit 50 is always active and is adapted to monitor the state of the motion sensing switch 44 and produce a timed oscillator enable signal at its output 51 whenever a change in the state of the motion sensing switch 44 is detected. In the preferred embodiment, the timed oscillator enable signal comprises a 26-second pulse. If motion continues to be detected, successive enable signals will be produced so that the oscillator enable signal on line 51 will terminate 26 seconds after all motion of the beacon has ceased. To conserve battery life, the motion detector and oscillator enable circuit 50 is the only circuit that remains active at all times.

Figure 7:
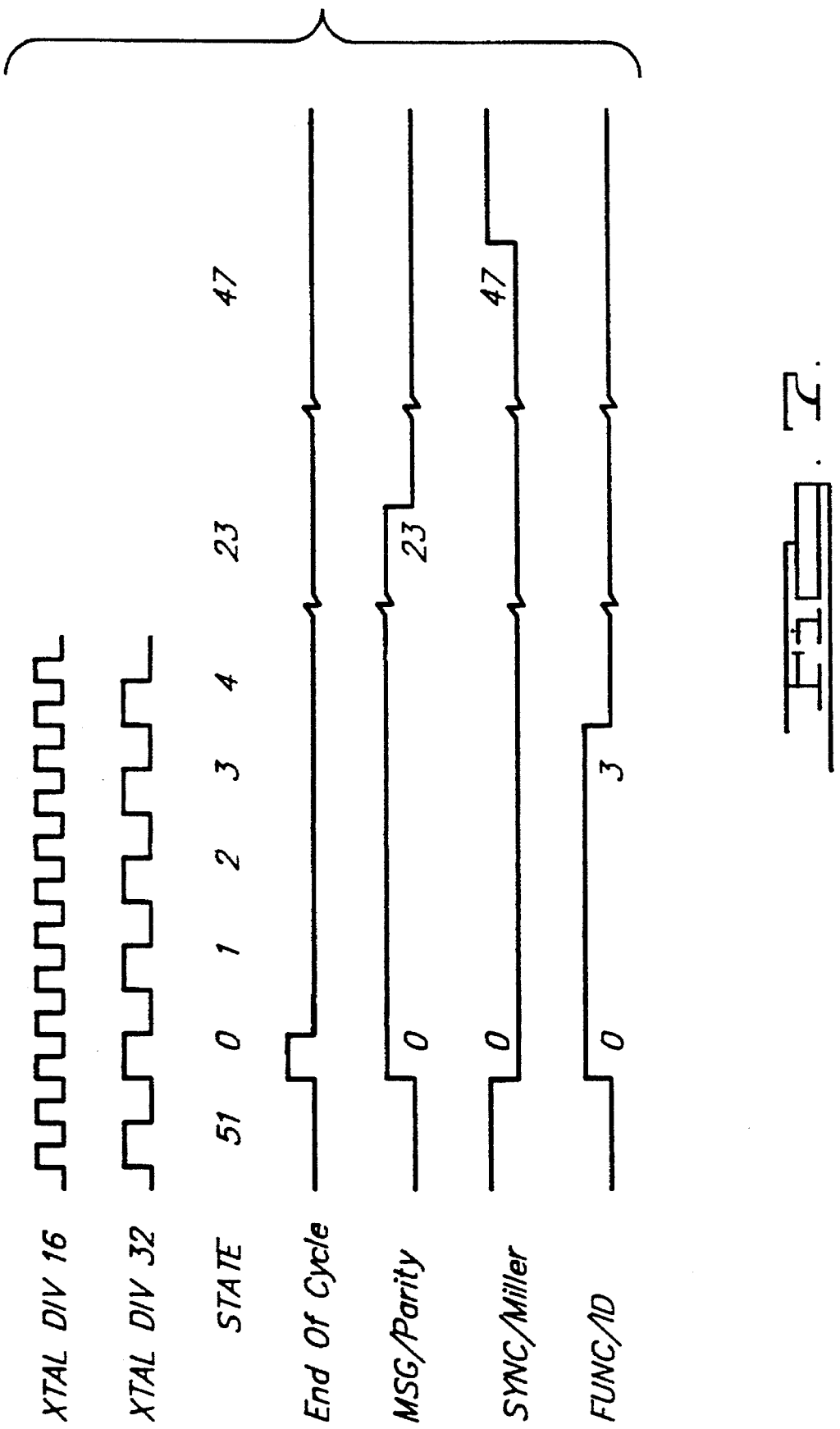
FIG. 7 is a timing diagram illustrating the various signals produced by the timing controller 54 shown in FIG. 6.

In response to the oscillator enable signal on line 51, the oscillator circuit 52 is activated to produce the 32.768 KHz crystal clock signal ("XTAL") at its output. The 32.768 KHz crystal clock signal is provided to a timing controller circuit 54 that is adapted to produce the various timing signals used for generating the code word, initializing the various circuits, and sequence control. The various timing signals produced at the output of the timing controller 54 are illustrated in the timing diagram shown in FIG. 7. In particular, the XTAL divide-by 16 and XTAL divide-by 32 clock signals are produced at the clock [0-2] output lines; the 0-51 State Count corresponding to the 48-bit code word plus the four SYNC bits, is produced at the State Count [0-5] output lines; and the Parity, Miller, FUNCTION, and IDENTIFICATION signals are produced at the Control [0-3] output lines. The State [0-1] output line is provided to the encoded data generator 64 and supplies a sync pulse or end-of-message pulse at the end of each complete cycle.

A debounce circuit 56 is shown connected to four function switches although, as previously noted, the preferred embodiment herein utilizes only two function switches 30 and 32. The four outputs from the debounce circuit 56 are connected to the message generator circuit 58 which controls the content of the IDENTIFICATION and FUNCTION information produced at the MESSAGE output. The status of the four function inputs determines the content of the 4-bit FUNCTION code. The 20-bit IDENTIFICATION code, on the other hand, is set at the manufacturing stage by connecting the 20 input lines (ID0–ID19) to the message generator 58 to prewired fused-link jumpers, or to a preprogrammed EEPROM memory. The MESSAGE output from the message generator 58 comprises a serial output signal that is provided to the error correction code (ECC) encoder 60. The ECC encoder 60 is adapted to generate a 24-bit error correction code based upon the content of the MESSAGE code received from the message generator 58.

Figures 8, 9:
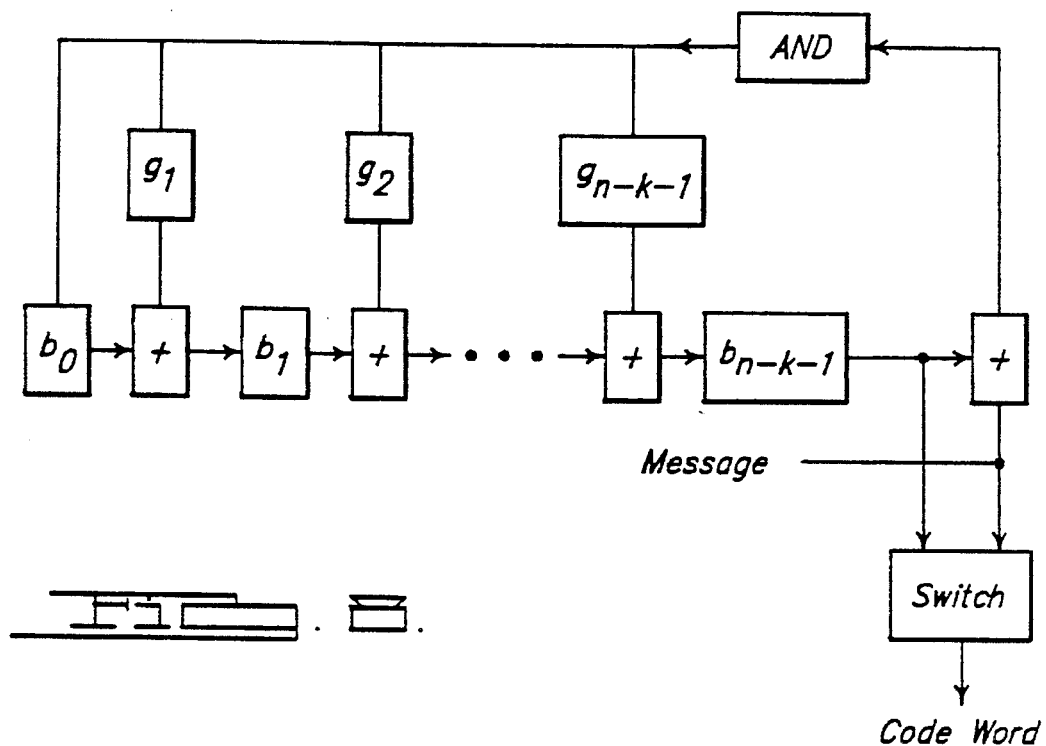
FIG. 8 is a block diagram of a linear $N_p$ stage shift register used to generate the error correction code polynomial used in the preferred embodiment.
FIG. 9 is a diagrammatical view of the steps used to generate the transmitted beacon code.

The parity bits, or error correction code, are generated using a linear $N_p$ stage shift register connected as illustrated in FIG. 8, where:

$g_i$ is the ith coefficient of the generator polynomial $g(X)=1+g_1X+g_2X^2+ \ldots +g_{n-k-1}X^{n-k-1}+g_{n-k}X^{n-k}$, n is the total number of bits in the code word, in this case 48, k is the number of message bits in the code word, in this case 24, $b_i$ is the value stored in the ith register, + indicates an exclusive OR-gate, AND indicates an AND-gate, switch is a multiplexer, and "Message" is the bit pattern consisting of the FUNCTION code followed by the ID code.

The specific generator polynomial used in the preferred embodiment is as follows:

$g(X)=1+X=X^2+X^4+X^5+X^6+X^8+X^9+X^{10}+X^{13}+ X^{16}+ X^{17}+X^{19}+X^{20}+X^{22}+X^{23}+X^{24}$.

The anti-slip pattern generator 62 generates a fixed 48-bit pattern at the same clock rate as the serial output from the ECC encoder 60. As previously noted, the anti-slip pattern is superimposed onto the code word to prohibit the receiver from detecting a valid code from another beacon with a similar code that is shifted in position relative to the valid beacon code. This serves to reduce the probability of false detection from other beacons. The anti-slip pattern used in the preferred embodiment which begins in bit position 0 is as follows:

1100 1100 1011 0101 1111 0000
0000 1111 1010 1101 0011 0011.

The serial outputs from the anti-slip pattern generator 62 and the ECC encoder 60 are provided to the encoded data generator 64. The encoded data generator 64 is adapted to exclusively-OR the 48-bit anti-slip pattern with the 24-bit MESSAGE and 24-bit ECC code word and then Miller encode the data. In addition, the encoded data generator 64 also adds the 4-bit SYNC code to the beginning of the Miller encoded data word. The resulting encoded data word is serially provided to an antenna drive circuit 66 which is connected to the tuned antenna circuit 68.

To summarize, the various steps for generating the transmitted beacon code are diagrammatically illustrated in FIG. 9. Initially, the 4-bit FUNCTION code is determined in accordance with the status of the various FUNCTION switches. The 20-bit IDENTIFICATION code which is stored in the beacon chip, is combined with the 4-bit FUNCTION code to make a MESSAGE. Based upon the content of the MESSAGE, 24 parity bits are generated using the ECC polynomial. The parity bits are then appended to the MESSAGE resulting in a 48-bit code word. Each of the 48 bits in the code word is then exclusive-OR'ed with each bit of a predetermined 48-bit anti-slip pattern. The resulting 48-bit code word is then Miller encoded and a 4-bit SYNC pattern, illegal under the Miller code, is added to the beginning of the Miller encoded word.

Figure 10:
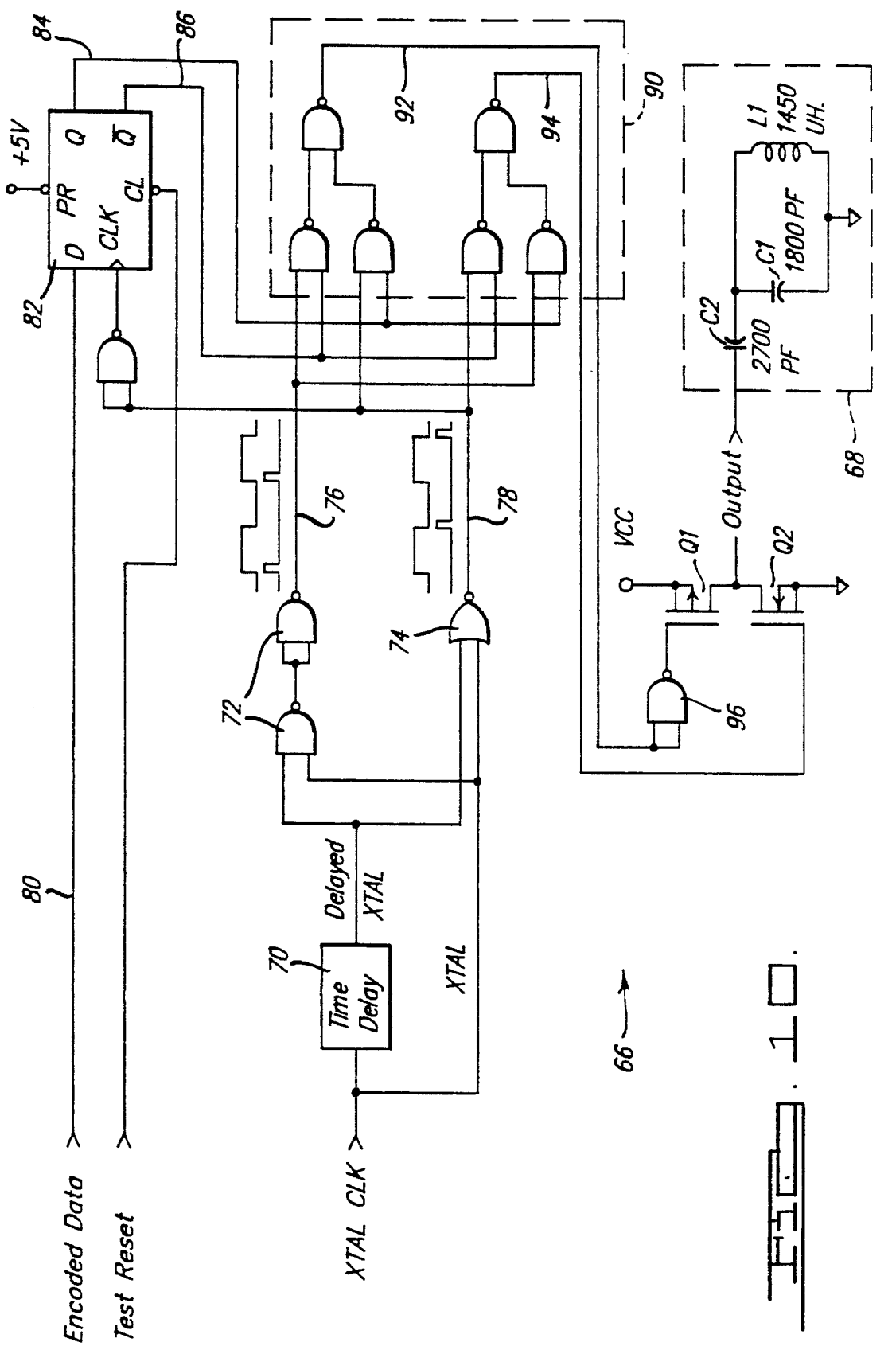
FIG. 10 is a detailed circuit diagram of the antenna driver circuit 66 of FIG. 6.

Turning now to FIG. 10, a detailed circuit diagram of the antenna drive circuit utilized in the preferred embodiment is shown. The antenna drive circuit is designed to meet the following objectives: (1) high output efficiency; (2) average battery drain of less than 40 microamps over normal operating conditions; (3) frequency tripling to allow the use of an inexpensive 32.768 KHz crystal oscillator; (4) a reasonably clean signal spectrum; (5) freedom from latch-up during normal operation; and (6) a small number of external components. The preferred embodiment of the present beacon/transmitter utilizes a bipolar antenna drive circuit 66 which serves to inject as much energy as possible into the antenna to improve the efficiency of the beacon. The bipolar drive circuit 66 produces narrow drive pulses that are provided to the antenna circuit 68 every 1.5 cycles, alternately driving the antenna circuit 68 toward the battery voltage and toward ground. With this approach, an output capacitor C2 is required, and the signal decays for only 1.5 cycles between pulse injection. An additional benefit of the bipolar drive circuit is that the antenna oscillates at a peak-to-peak voltage equal to the battery voltage.

To generate the bipolar drive signal, the XTAL clock signal is provided through a time delay circuit 70 to produce a DELAYED XTAL clock signal. The XTAL and DELAYED XTAL clock signals are then provided to the inputs of an AND-gate equivalent 72 and a NOR-gate 74 to produce a first narrow pulse train on line 76 and a second narrow pulse train on line 78 shifted by 180 degrees relative to the signal on line 76. The waveform illustrated above the narrow pulse train waveforms represents the phase-shifted difference between the XTAL and DELAYED XTAL clock signals. The Encoded Data signal on line 80 is clocked through a D flip-flop 82 by the XTAL clock signal to provide non-inverted and inverted Encoded Data signal on output lines 84 and 86, respectively.

Figure 11:
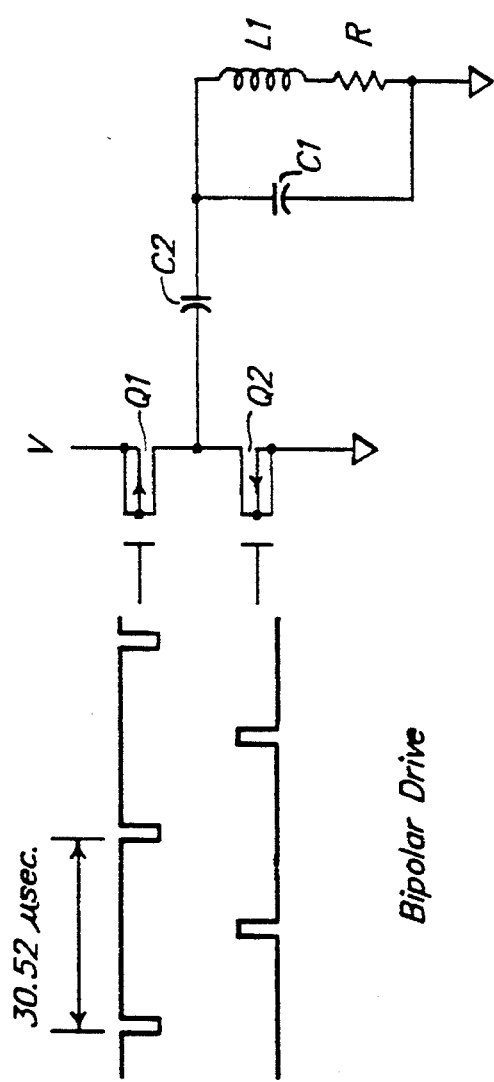
FIG. 11 is a combined timing and circuit diagram illustrating the manner in which the bipolar driver signal is generated.
Figure 12:
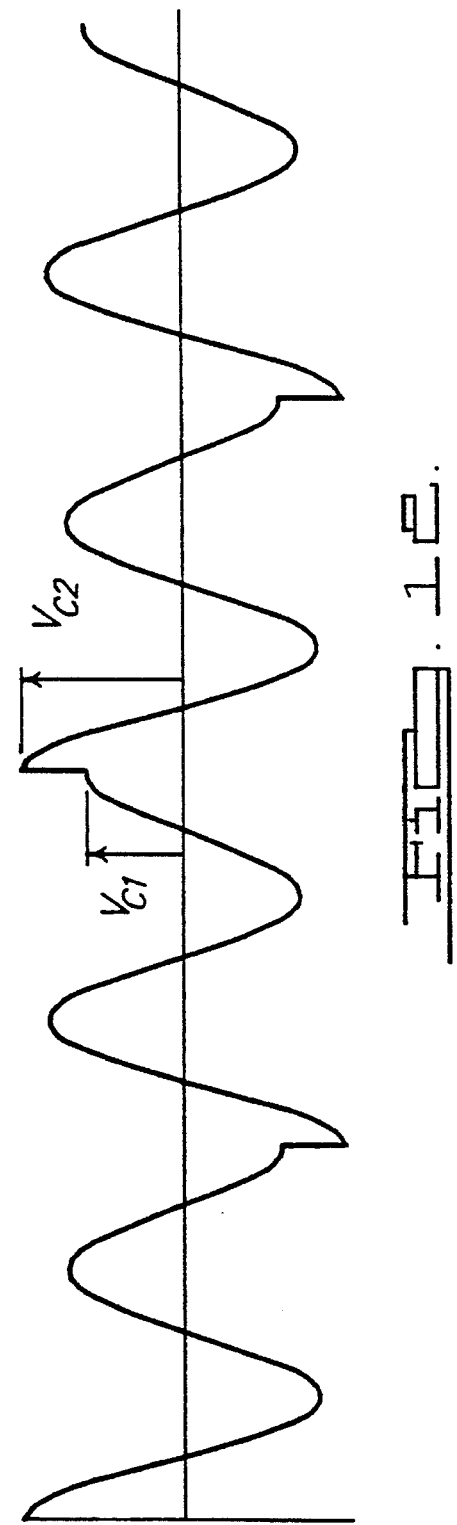
FIG. 12 is a signal diagram illustrating the waveform of the beacon antenna.

The non-inverted and inverted Encoded Data signals on lines 84 and 86 and the first and second narrow pulse train signals on line 76 and 78 are provided to a logic gate network 90 having two output lines 92 and 94. The logic gate network 90 functions in the following manner. When a clock pulse is present on line 76, the presence of a logic "1" in the Encoded Data word will result in a HI signal pulse being produced on output line 94 and the presence of a logic "0" in the Encoded Data word will result in a LO signal pulse being produced on output line 92. Conversely, when a clock pulse is present on line 78, the presence of a logic "1" in the Encoded Data word will result in a HI signal pulse being produced on output line 92 and the presence of a logic "0" in the Encoded Data word will result in a LO signal pulse being produced on output line 94. The output signal on line 92 is inverted by inverter 96 and the two resulting parallel data signals are then provided to the gates of two N-type and P-type FET transistors Q1 and Q2, as illustrated in FIG. 11. Note that the period of the two resulting signals provided to the FETS Q1 and Q2 is equal to 1/32.768 KHz or 30.52 microseconds. The resulting waveform generated by the antenna circuit 68 from being driven by the bipolar drive signal is illustrated in FIG. 12. As can be seen from the waveform illustrated in FIG. 12, the bipolar drive circuit 66 injects energy into the tuned antenna circuit 68 every one-and-a-half cycles, thereby optimizing the amount of energy injected into the antenna L1 and improving the efficiency of the beacon.

Receiver/Controller

Figure 13A:
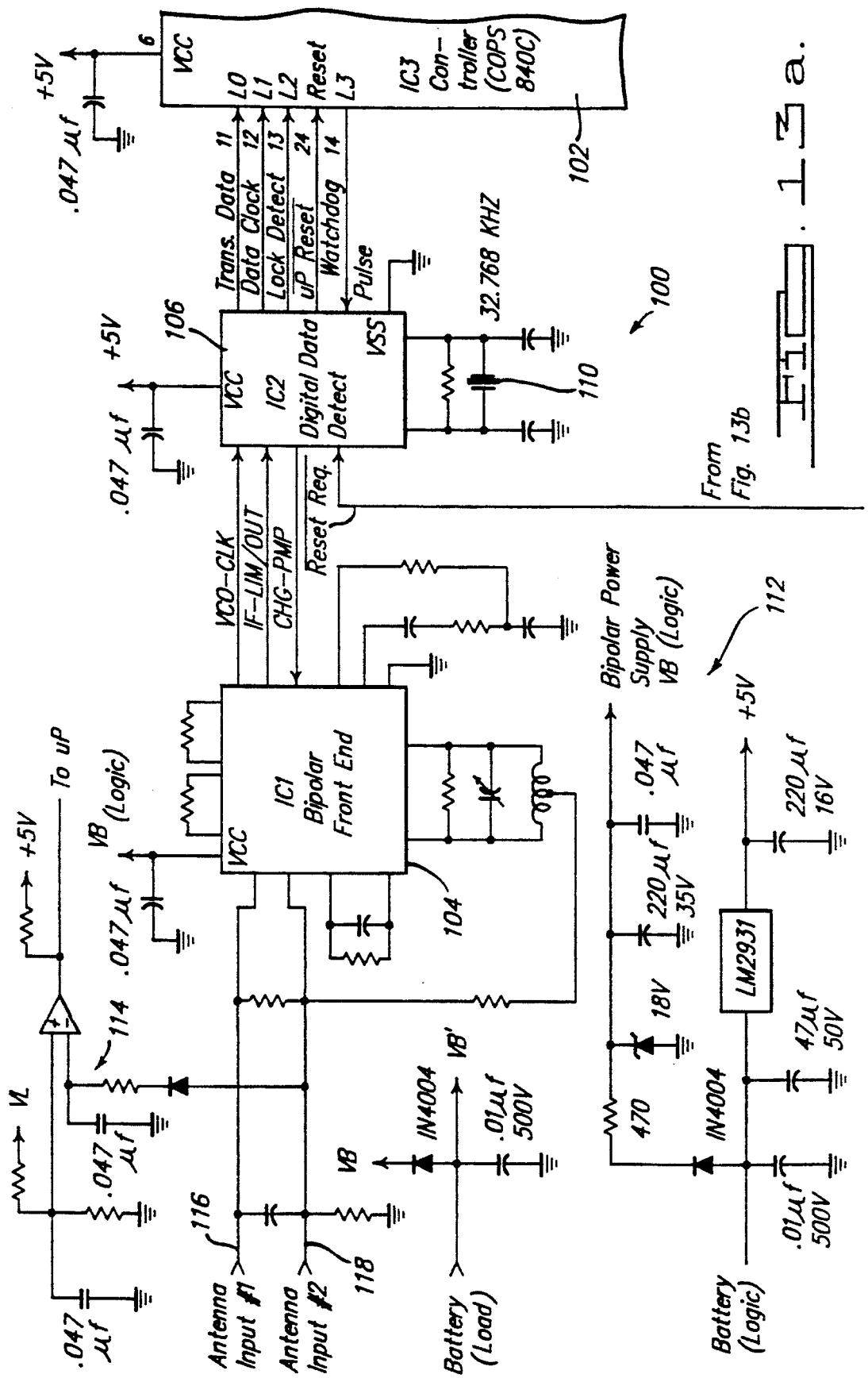
FIGS. 13a–13c are circuit diagrams of the receiver/controller according to the present invention.
Figure 13B:
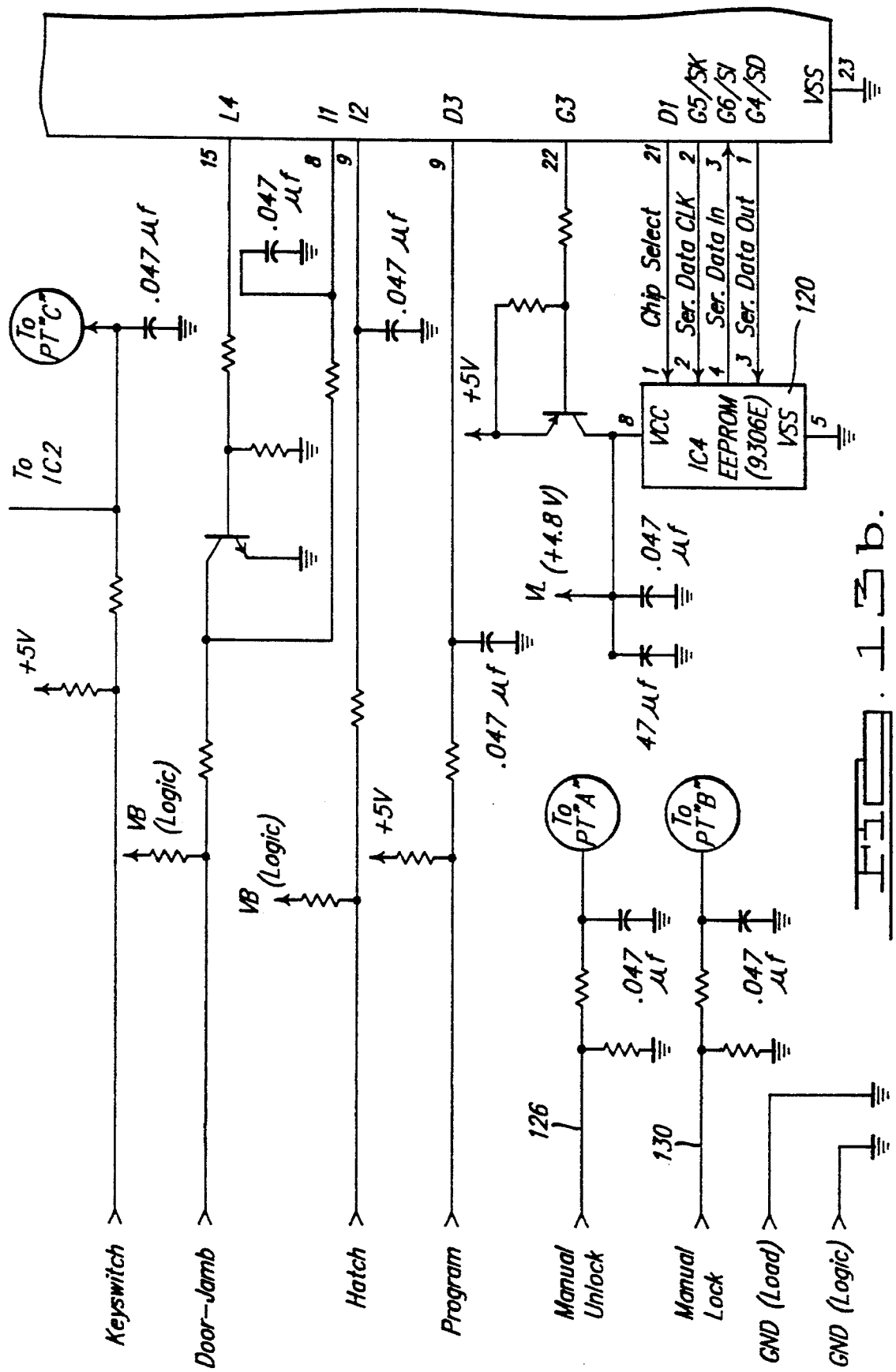
Figure 13C:
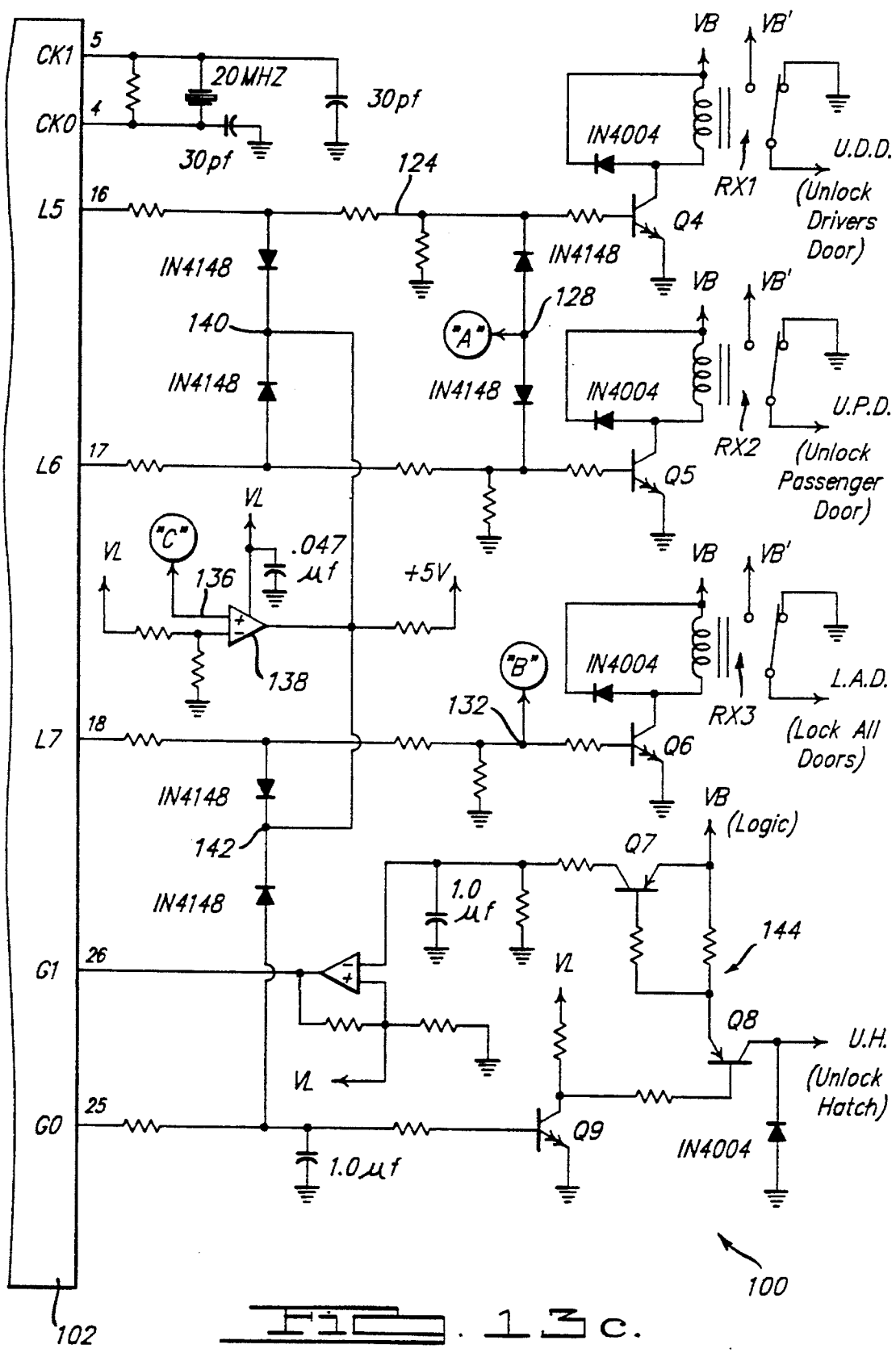

Referring now to FIGS. 13a–13c, a circuit diagram of the receiver/controller 100 according to the present invention is shown. The receiver/controller 100 is adapted to receive the radio frequency signal received by the antenna, detect the presence of a beacon signal, demodulate the signal, and determine the content of the serial information being transmitted. If the transmission is determined to be a valid beacon code, the receiver/controller 100 further performs the instructed function corresponding to the function code in the received transmission.

In general, the receiver/controller 100 comprises a microcomputer 102 for performing logical and mathematical calculations, receiver circuitry for receiving and detecting the presence of a beacon transmission, a non-volatile memory device 120 for storing valid identification codes, and output circuitry for controlling various vehicle features such as door and trunk locks. The two inputs 116 and 118 from the receiving antenna are provided to an analog receiver circuit that is implemented in the preferred embodiment with a custom integrated circuit 104. The analog bipolar receiver circuit 104 comprises a single conversion superheterodyne receiver having an intermediate frequency of 4.274 KHz. The signal received from the tuned antenna coil comprises a voltage proportional to the magnetic field received from the beacon. This signal is amplified by a preamplifier, filtered, and mixed with a voltage controlled oscillator ("VCO") frequency signal to create an intermediate frequency ("IF"). The intermediate frequency signal is further amplified, filtered, and limited to CMOS signal levels for processing by the digital data detector circuit 106.

The digital data detector circuit 106, which is also implemented in the preferred embodiment with a custom integrated circuit, is adapted to detect the presence of a beacon signal and produce an output signal to "wake up" the microcomputer 102. The digital data detection circuit 106 also demodulates the PSK encoded signal from the beacon. Data synchronization circuitry extracts the clock from the resulting Miller encoded signal and clocks the data into the microcomputer. To minimize average power consumption of the receiver/controller 100, the digital data detection circuit 106 also signals the microcomputer 102 to go into a stand-by mode when the beacon is out of range.

In this regard, the bipolar front end receiver circuit 104, the digital data detection circuit 106, and the voltage regulator 112 are the only circuits that remain active at all times. In the preferred embodiment the total quiescent current draw for the receiver/controller 100 is less than one milliampere. Thus, vehicle battery power is conserved.

The microcomputer 102 used in the preferred embodiment comprises an 840 Series 8-bit microcomputer manufactured by National Semiconductor. The microcomputer is programmed to decode the Miller encoded signal received from the digital data detection circuit 106 and compare the resulting bit patterns with the data previously stored in a non-volatile memory 120. Based upon the results of this comparison, the microcomputer 102 is further programmed to control the activation of various functions such as door and trunk locks. A separate algorithm stored in the microcomputer is provided for programming new identification codes into the non-volatile memory 120. Significantly, in the preferred embodiment, the EEPROM 120 has the capacity for storing and the microcomputer 102 is programmed to accept and check for more than one valid beacon code. In this manner, several different beacons can be validated and used in conjunction with a single receiver/controller 100.

In addition, the receiver/controller 100 includes interface circuitry 112 including a power regulator and a transient suppressor to isolate the receiver/controller circuitry from noise on the 12-volt battery lines. The interface circuitry 112 also provides various regulated power supply voltages.

The various additional inputs to the receiver/controller circuit 100 serve the following functions. The Key Switch input is grounded when the key is in the ignition and serves to inhibit the keyless entry system by grounding the various output lines from the microcomputer 102 to the relay driver circuits that activate the doors and trunk lock mechanisms. The Doorjamb input is used by the microcomputer 102 in combination with the Key Switch input to automatically lock all of the vehicle doors when the beacon is out of receiving range. In particular, the microcomputer 102 is programmed to automatically lock all of the vehicle doors a predetermined period of time after the beacon is out of range and all of the vehicle doors have been closed, but only if the key is not in the ignition. The Hatch or trunk lid input signal is provided as a feedback signal to the microcomputer 102 to prevent repetitive actuation of the trunk or hatch unlock solenoid. The Program input is used to activate the receiver/controller programming mode. A new identification code can then be programmed into the non-volatile memory 120 of the receiver/controller 100. Specifically, to program a new beacon ID code into the controller, the Program input line is grounded and a beacon is brought within range of the receiving antenna. The ID code from the beacon is thereupon read by the microcomputer 102 into the EEPROM 120. In this manner, if a beacon is lost, a new beacon with a different identification code can be provided and the new beacon ID code conveniently programmed into the receiver/controller 100 by an authorized service personnel. The Manual Lock and Manual Unlock inputs are provided to the receiver/controller 100 to manually override the system regardless of the state of the microcomputer 102. In particular, actuation of the manual lock and/or unlock buttons on the vehicle will override the microcomputer 102 and activate the appropriate lock and/or unlock solenoids regardless of the state of the control outputs from the microcomputer 102.

The output terminals from the microcomputer 102 are provided to various relay driver circuits that serve to activate the various lock and unlock door and trunk mechanisms. In addition, it is preferred that the relay driver circuits that interface with external relays or solenoids include short circuit protection circuitry to protect the microcomputer 102 and the relay driver circuits in the event of a short in the external relays or solenoids.

The various relay driver circuits function in essentially the same manner. Therefore, the following description of the Unlock Driver's Door relay driver circuit can be considered applicable to the remaining relay driver circuits as well.

When the microcomputer 102 determines from decoding the function code from a valid beacon transmission that the driver's door is to be unlocked, the microcomputer 102 produces a logic HI signal at output port L5 on pin 16. The HI signal on line 124 serves to bias the Darlington transistor Q4 into full conduction, thereby energizing the relay coil of relay RX1. Energization of relay coil RX1 in turn serves to energize a motor (not shown) that is operatively connected to the lock mechanism of the driver's door and is effective to unlock the door. As previously noted, if the manual lock or unlock buttons in the vehicle are actuated, the receiver/controller 100 is overridden regardless of the state of the microcomputer 102. In particular, if the manual unlock button is actuated, a positive signal pulse is produced on line 126 which results in a corresponding positive signal pulse being provided at node 128, designated "Point A" in the circuit diagram. The positive signal pulse at node 128 is effective to immediately turn on Darlington transistor Q4 as well as Darlington transistor Q5 to thereby energize both relays RX1 and RX2 and unlock the driver's side and passenger doors. Similarly, if the manual lock button is actuated, a positive signal pulse is provided on line 130 which results in a positive signal pulse being provided at node 132, designated "Point B" in the circuit diagram. The positive signal pulse at node 132 is effective to turn on Darlington transistor Q6 which in turn energizes relay coil RX3 and locks all of the vehicle doors.

As also previously noted, the receiver/controller 100 in the present keyless entry system is adapted to inhibit system operation whenever the ignition key is in the ignition. Specifically, upon insertion of the key in the ignition, a LO signal pulse is produced on line 134, designated "Point C" in the circuit diagram, which results in a corresponding LO signal being provided on line 136 to the positive input of a comparator 138. This in turn causes the output of comparator 138 to go LO, thereby pulling nodes 140 and 142 to ground potential and inhibiting the output ports L5–L7 and G0 of the microcomputer 102. Accordingly, it will be appreciated that when the key is in the ignition, the microcomputer 102 is inhibited from activating switching control transistors Q4–Q6 and Q9 in the various relay driver circuits, thereby effectively inhibiting operation of the system.

The additional circuitry 144 shown in the "unlock hatch" drive circuit is provided to detect a short circuit in the remotely located unlock hatch solenoid (not shown) and, in such event, pulse width modulate the Darlington transistor Q9. Optionally, additional circuitry 114 may also be provided at the antenna input 118 to provide a continuity test for the antenna connections.

Figure 14:
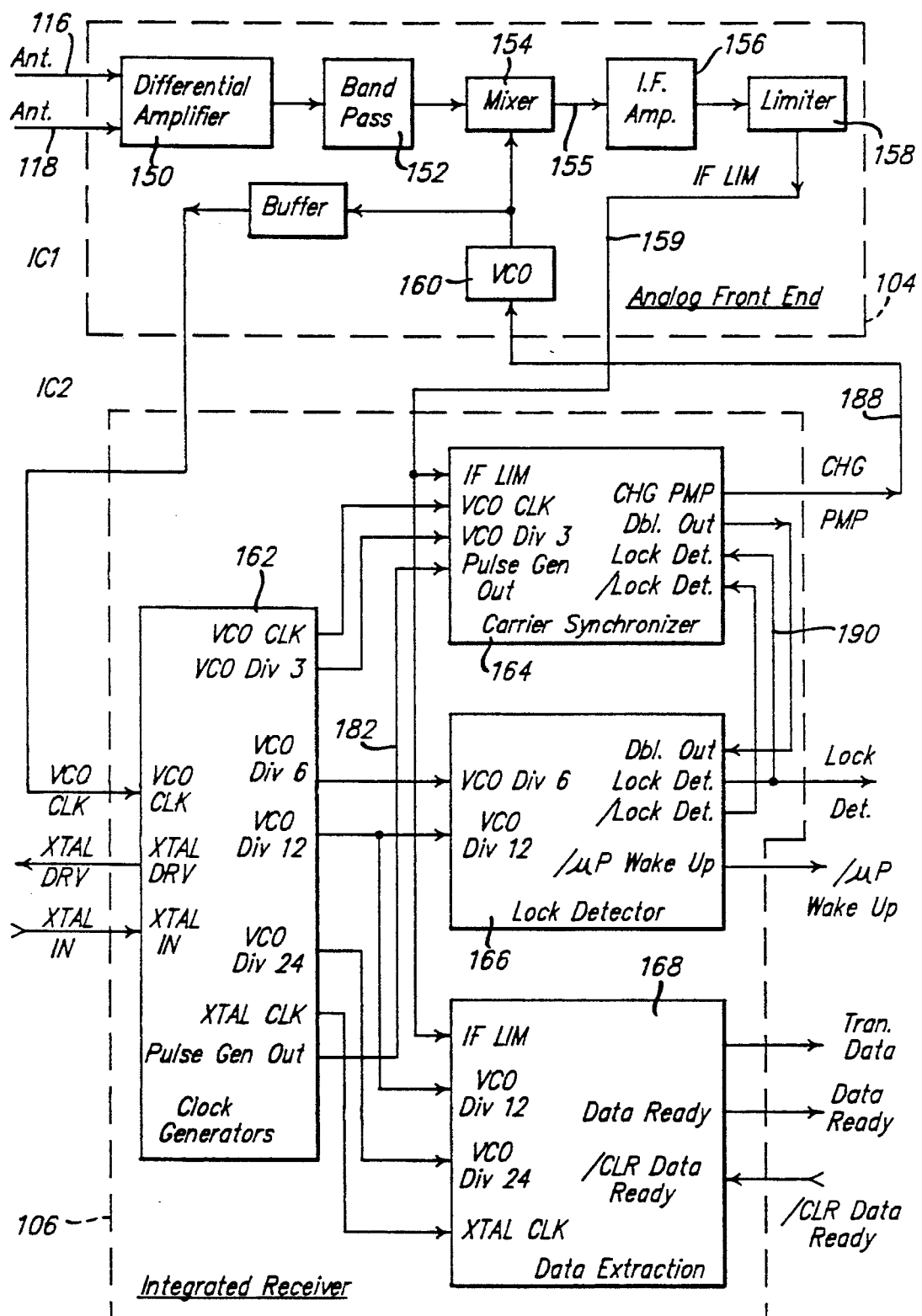
FIG. 14 is a block diagram of the bipolar front end and digital data detect custom integrated circuits used in the receiver/controller.

Turning now to FIG. 14, blocked diagrams of the custom integrated circuits 104 and 106 utilized to process and demodulate the incoming signal from the antenna are shown. The analog receiver IC 104 comprises a very low power amplifier, filter, and converter circuit. The circuit accepts a narrowband PSK signal at 98.304 KHz from the tuned antenna circuit. The signal is amplified and mixed down to an intermediate frequency ("IF") of 4.274 KHz in the preferred embodiment. The resulting IF signal is filtered and amplified with the last stage performing a limiting function. The resulting output signal is a 0–5 volt square wave signal with an approximately 50 percent duty cycle.

With particular reference to the drawing, the two output lines, 116 and 118, from the antenna are provided to a differential amplifier 150 which minimizes common mode noise and amplifies the antenna signal. The output from the differential amplifier 150 is provided to a high Q, very narrow bandwidth, bandpass filter having a center frequency of 98.304 KHz, the frequency of the beacon transmission. The output from the bandpass filter 152 is in turn provided to a mixer 154 which converts the incoming signal down to an intermediate frequency signal of 4.274 KHz in the preferred embodiment. More particularly, the mixer 154 is adapted to take the difference in frequency between the incoming signal from the bandpass filter 152 and the output signal from the voltage controlled oscillator (VCO) circuit 160. The voltage controlled oscillator 160 in the preferred embodiment is designed to lock onto a frequency signal of 102.578 KHz, thus providing the 4.742 KHz differential intermediate frequency between the VCO frequency signal and the beacon frequency signal. The IF signal on line 155 is amplified by an amplifier circuit 156 and thereafter provided to a limiter circuit 158 which converts the signal to a square wave signal having approximately a 50 percent duty cycle. The resulting output signal from the limiter circuit 158 on line 159 is provided to the digital data detection circuit 106.

Figure 15:
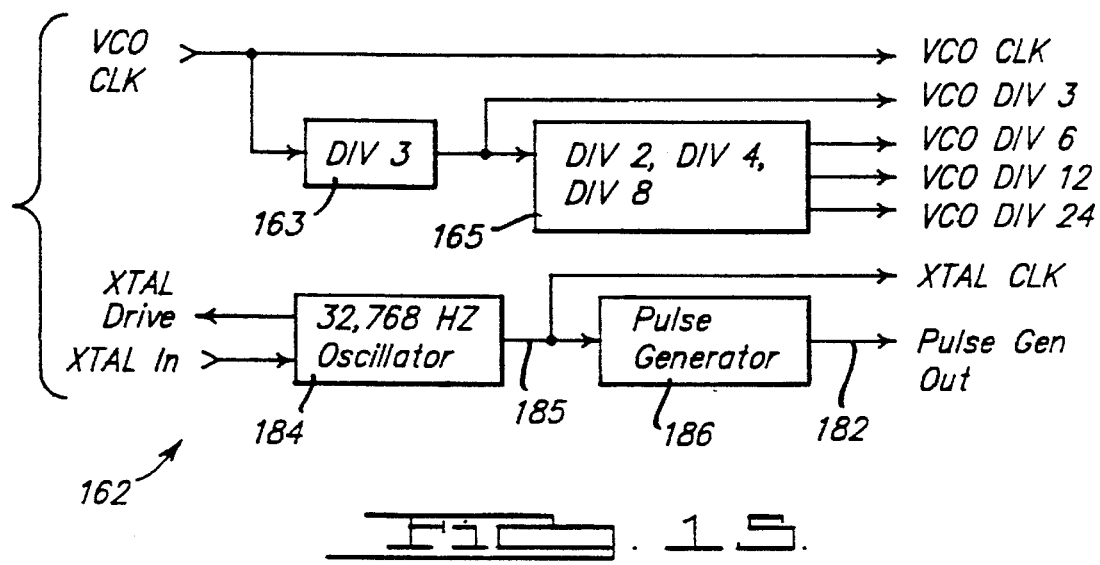
FIG. 15 is a detailed block diagram of the clock generator circuit shown in FIG. 14.

The digital data detector 106 performs the following functions. A clock generator circuit 162, shown in greater detail in FIG. 15, has an oscillator circuit 184 which uses the 32.768 KHz crystal 110 (FIG. 13a) to generate a 32.768 KHz crystal clock signal (XTAL CLK). The clock generator circuit 162 also receives the VCO clock signal, and contains divider circuits 163 and 165 which divide down the VCO clock signal. These signals are used in the other blocks as timing signals. The carrier synchronizer 164 combines with the voltage controlled oscillator 160 in the bipolar front end chip 104 to make up a phase lock loop circuit (PLL). The PLL circuit recreates the carrier frequency necessary to decode the PSK signal. Rapid frequency acquisition and phase synchronization with a detected beacon signal are enhanced by a frequency sweep circuit that is controlled by a counter circuit which compares the VCO frequency to the crystal oscillator frequency when a beacon is not in range. In this manner, the frequency of the VCO circuit is made to gradually sweep up and down around the 102.578 KHz frequency to thereby keep the frequency of the VCO signal within the vicinity of the expected frequency of a beacon transmission. The lock detector circuit 166 is adapted to produce a "μP wake-up signal" when a beacon signal has been detected and the receiver is properly synchronized to the beacon signal. In other words, the lock detector circuit 166 is adapted to activate the microcomputer 102 when it is determined that a beacon is present and the beacon signal has been "locked" onto. The microcomputer 102 is programmed thereafter to determine if the received beacon signal contains a valid beacon code. The lock detector circuit 166 essentially comprises a quadrature lock detector and a digital filter. When the phase lock loop circuit acquires both phase and frequency, the lock detector output from the lock detector circuit 166 goes HI. The μP wake-up signal similarly comprises a pulse which causes the microcomputer 102 to enter its active state. The data extraction circuit serves to demodulate the received signal to recover the data bit stream. A matched filter is included to remove noise from the signal and additional circuitry decodes the Miller encoded recovered transition bit stream. The decoding circuitry includes a clock synchronizer to regenerate and synchronize to the data sample clock which is required to demodulate the Miller encoded signal.

Figure 16:
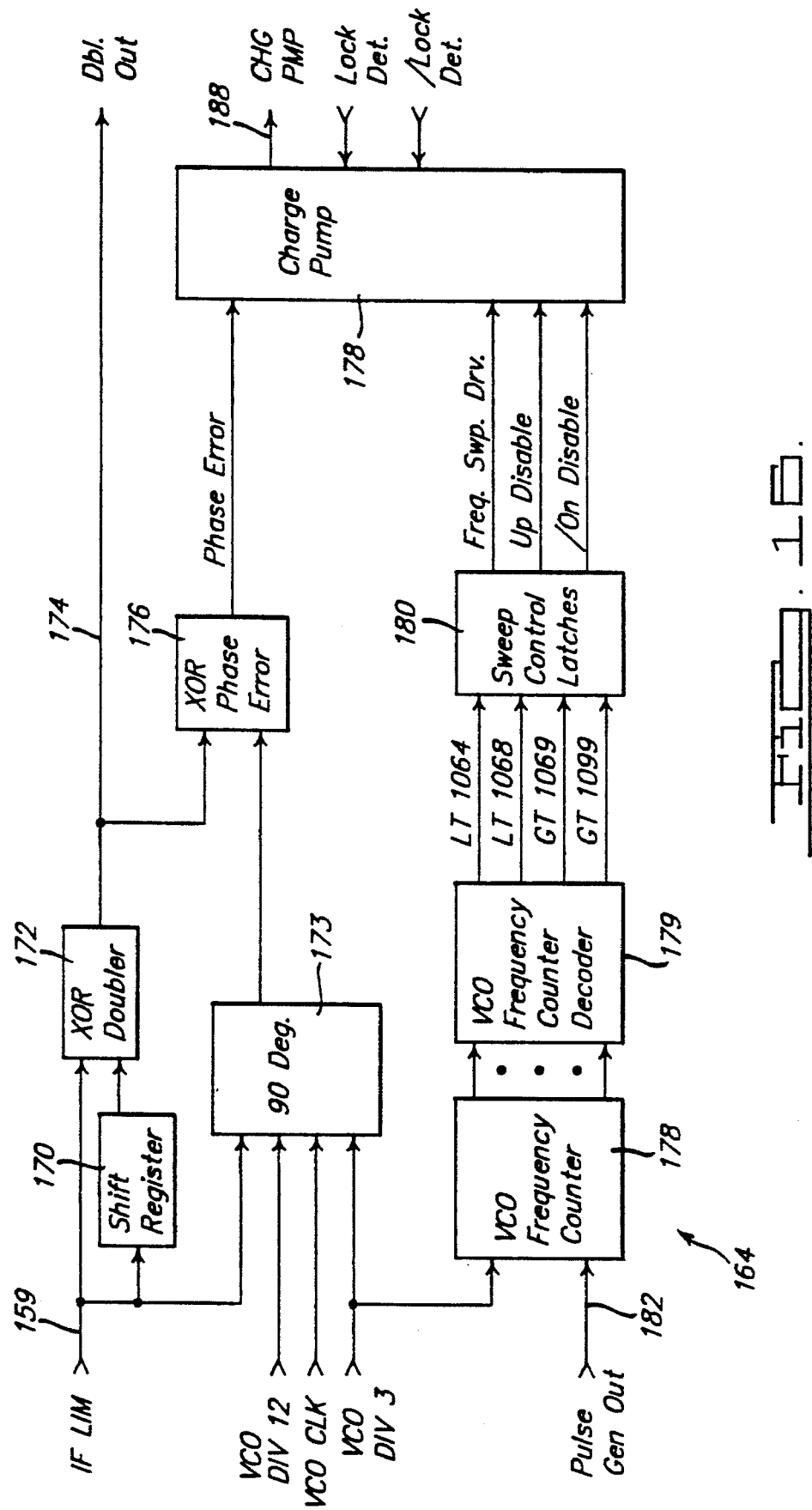
FIG. 16 is a detailed block diagram of the carrier synchronizer circuit shown in FIG. 14.

Referring now to FIG. 16, a more detailed block diagram of the carrier synchronizer circuit 164 is shown. As previously noted, the purpose of the carrier synchronizer 164 is to recreate the carrier frequency signal in proper phase with the received beacon transmission. The regenerated carrier signal is required to demodulate the PSK encoded beacon transmission. The carrier synchronizer 164 includes the circuit components which, together with the VCO circuit 160 in the bipolar front end IC 104, comprise a long loop phase locked loop circuit with frequency doubling. In particular, the output signal from the bipolar front end IC 104 on line 159 is provided to a shift register 170 which shifts the phase of the incoming signal by approximately 90 degrees. The incoming signal on line 159 together with the phase shifted signal on line 171 are then provided to a frequency doubler 172 which mixes the two signals to provide a resulting output signal on line 174 having a frequency double that of the input frequency signal on line 159. The doubled frequency output signal (DBL OUT) on line 174 is provided to one input of a phase error circuit 176 which has its other input connected to the output of a 90-degree delay circuit 173. The 90-degree delay circuit 173 delays the VCO DIV 12 signal from the clock generator circuit 162 by 90 degrees. The phase error block 176 in the preferred embodiment comprises an exclusive-OR gate which, in a digital system, provides a very close approximation to the mixer used in analog phase lock loop circuits. The duty cycle of the output signal from the phase error circuit 176 reflects the amount of phase error between the VCO DIV 12 signal and the doubled IF signal on line 174. Exactly 50 percent duty cycle corresponds to a zero phase error. Any other duty cycle causes the charge pump circuit 178 to produce a voltage signal on output line 180 which is fed back to the VCO circuit 160 to correct the VCO frequency and reduce the phase error. When the phase lock loop circuitry has acquired both the frequency and phase of the beacon signal, the LOCK DETECT signal provided to the charge pump circuit 178 to disable the frequency sweep function.

In order to minimize the amount of time it takes for the receiver/controller to lock onto the beacon transmission, a 32.768 KHz watch crystal 110 (FIG. 13a) comparable to the watch crystal 46 in the beacon, is included in the receiver circuitry to provide a fixed frequency signal that closely approximates the expected frequency of the beacon transmission. Returning to FIG. 15, the clock generator circuit 162 includes a 32.768 KHz oscillator circuit 184 that is connected to the watch crystal 110 and is adapted to produce a fixed frequency output signal on line 185 (XTAL CLK) substantially equal to the crystal frequency of the beacon signal. The XTAL CLK signal on line 185 is provided through a pulse generator 186 which divides the frequency of the XTAL clock signal by a factor of 3. The resulting pulse generator output signal on line 182 is provided to the carrier synchronizer circuit 164 and is used to keep the frequency of the output signal from the voltage controlled oscillator 160 within the vicinity of 102.578 KHz. In particular, the pulse generator output signal on line 182, together with the VCO DIV 3 signal, are provided to a VCO frequency counter 178 and VCO frequency counter decoder 179 which essentially compare the frequency of the VCO signal to the frequency of the XTAL clock signal. The output is then provided to a sweep control latch circuit 188 which in turn directs the charge pump circuit 178 to slowly sweep the frequency of the output signal from the voltage controlled oscillator 160 up and down within a couple hundred Hertz of 102.578 KHz. In other words, the VCO frequency counter, decoder, and sweep control latch circuits 178–180 serve to provide a feedback loop for the charge pump circuit 178 when no beacon is within range of the receiver antenna to thereby slowly dither the frequency of the VCO signal within the vicinity of 102.578 KHz. In this manner, the receiver/controller 100 is able to rapidly lock onto the phase of the beacon frequency signal when a valid beacon signal is detected. Once a beacon comes within range of the receiving antenna, the charge pump circuit 178 is primarily influenced by the phase error circuit 176 and thus functions as a conventional phase lock loop circuit. Accordingly, circuits 178–180 have no effect on the operation of the phase lock loop circuitry once a beacon is within range. This is accomplished by the lock detector circuit 166 which produces a LOCK DETECT output signal on line 190 when a beacon signal is detected that is provided to the charge pump circuit 178 and is effective to disable the frequency sweep function.

Figure 17:
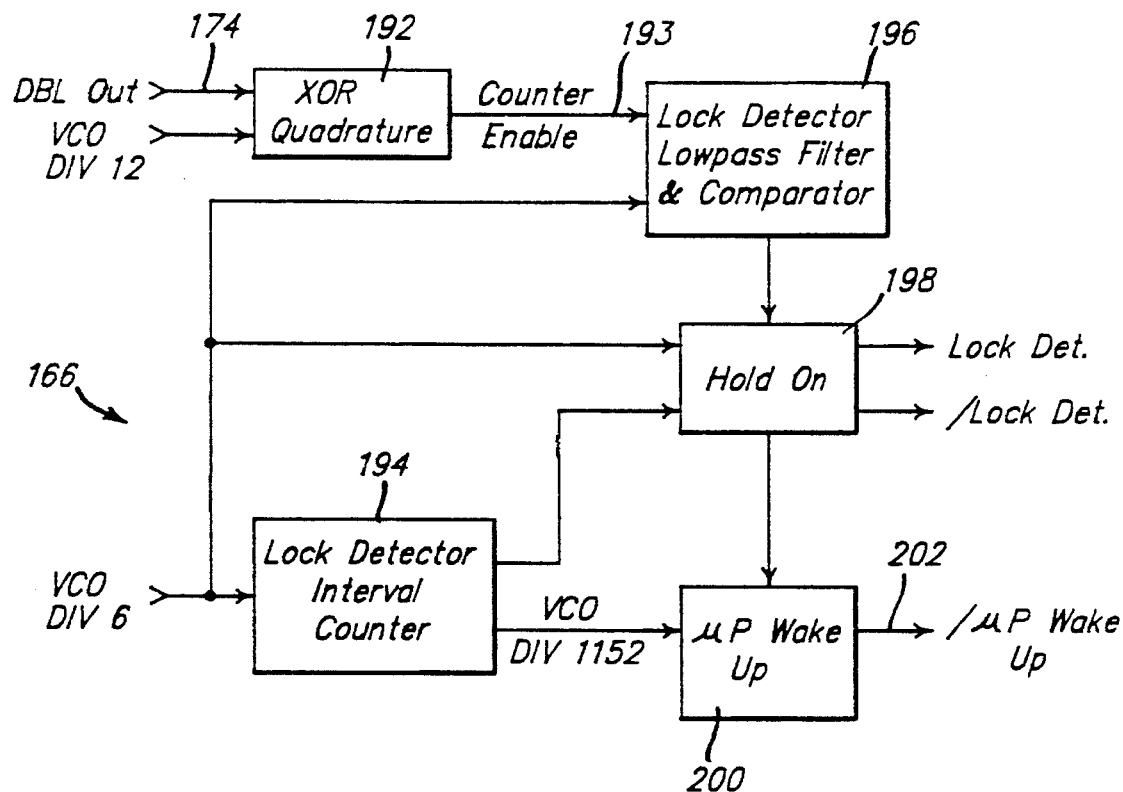
FIG. 17 is a detailed block diagram of the lock detector circuit shown in FIG. 14.

Referring now to FIG. 17, a detailed block diagram of the lock detector circuit 166 is shown. As previously noted, the lock detector circuit 166 determines when the receiver has detected and properly synchronized to a beacon signal and produces a μP wake-up signal to turn on the microcomputer 102. The microcomputer 102 thereupon determines if the received signal is from a valid beacon. The lock detector circuit 166 comprises an exclusive-OR quadrature circuit 192, a lock detector interval counter 194, a lock detector low pass filter and comparator 196, a hold-on circuit 198, and a μP wake-up circuit 200. In particular, the DBL OUT signal on line 174 from the carrier synchronizer circuit 164 and the VCO DIV 12 from the clock generator circuit 162 are provided to the inputs of the exclusive-OR quadrature circuit 192. It will be recalled that the DBL OUT signal on line 174, which has a frequency twice the frequency of the IF signal on line 159, has been phase shifted 90 degrees relative to the IF signal. Thus, the VCO DIV 12 signal is 90 degrees out of phase with the DBL OUT signal on line 174, thereby making the circuit a true quadrature detector. When a beacon signal is present and the PLL circuit has acquired both proper frequency and phase, the exclusive-OR quadrature circuit 192 will provide a HI output signal on line 193 most of the time. When the PLL circuit is unlocked, the output signal on line 193 will toggle up and down with an average HI time of approximately 50 percent. Lock detector circuits 194 and 196 are adapted to sample the quadrature output line 193 over a fixed period of time and count the number of samples which are in quadrature. In the preferred embodiment, lock is indicated when 384 or more samples are in quadrature out of a possible 511. Specifically, the lock detector counter 196 and interval counter 194 are reset at the same time and clocked by the same VCO DIV 6 clock signal. Interval counter 194 is incremented each clock pulse while the lock detector counter 196 is incremented at a clock pulse only if the output signal on line 193 is HI. If the count total in lock detector counter 196 is equal to or greater than 384 at the time of the next reset pulse, the hold-on circuit 198 is activated. Hold-on circuit 198 comprises a retriggerable one-shot circuit that is adapted to maintain the lock condition to the microcomputer 102 for approximately 500 milliseconds after it is no longer indicated by the counters 194 and 196. In this manner, the lock detector circuit 166 ignores dropouts in the beacon signal or short-term noise bursts. The μP wake-up circuit 200 comprises a D flip-flop that produces a 7.8 millisecond output pulse on line 202 that is provided to the microcomputer 102 in response to the production of the LOCK DETECT output signal from the hold-on circuit 198.

Turning now to FIG. 18, a detailed block diagram of the data extraction circuit 168 is shown. As previously noted, the data extraction circuit 168 demodulates the incoming PSK encoded signal and runs the resulting data bit stream through a matched filter to remove noise. Initial decoding of the Miller encoded data is performed and the synchronizing data clock is generated to decode the Miller code and clock the data bit stream into the microcomputer 102. Specifically, the data extraction circuitry 168 includes a data extraction circuit 204 which comprises an exclusive-OR gate having the PSK encoded signal on line 159 provided to one input and the synchronized VCO DIV 24 signal provided to its other input. Once locked onto the beacon signal, it will be appreciated that the frequency of the VCO signal (102.578 KHz) divided by 24 equals the same 4.274 KHz signal as the intermediate frequency (IF) signal on line 159. It will further be appreciated, therefore, that the synchronized VCO DIV 24 clock signal contains the recreated carrier phase locked to the intermediate frequency signal on line 159. The data extraction exclusive-OR gate 204 demodulates the PSK encoded signal and the output is filtered through a digital matched filter circuit 206. The early-late gate data synchronizer circuit 208 generates the clock signal used to decode the Miller encoded data and clock the data bit stream into the microcomputer 102. Initial decoding of the Miller encoded transition bit stream is then performed by the transition data bit stream generator 210. The serial data bit stream is provided to the microcomputer 102 on output line 214. The μ P data handshake circuit 212 interfaces with the microcomputer to control the serial inputting of the data bit stream into the microcomputer 102. In the preferred embodiment, final decoding of the data bit stream is performed in the microcomputer 102 by software.

While the above description constitutes the preferred embodiment of the invention, it will be appreciated that the invention is susceptible to modification, variation, and change without departing from the proper scope or fair meaning of the accompanying claims.

What is claimed is:

1. A keyless entry system for a vehicle comprising:

a portable beacon adapted to be carried by the operator of the vehicle and including transmitter means for transmitting at a predetermined frequency an encoded sinusoidal beacon signal comprising a plurality of data bits identifying said beacon, said beacon signal including a sinusoidal waveform having associated waveform peaks, said beacon further including an antenna drive circuit and a tuned antenna circuit adapted to resonate at said predetermined frequency, said tuned antenna circuit generating the sinusoidal waveform when excited by a drive signal from said antenna drive circuit, said antenna drive circuit providing a pulsed driving signal comprising periodic driving signal pulses interspersed with off periods to said tuned antenna circuit, said driving signal pulses being produced at a predetermined periodic rate related to said predetermined frequency so that the driving signal pulses substantially coincide with the peaks in the beacon signal waveform, and further wherein the duration of the driving signal pulses are substantially less than the off periods between successive driving signal pulses; and receiver means associated with said vehicle and including antenna means for receiving said beacon signal, signal processing means for decoding said beacon signal to recover said plurality of data bits, and controller means for determining from said plurality of recovered data bits whether said beacon signal corresponds to a valid beacon in activating a predetermined function associated with said vehicle in response thereto.

2. The keyless entry system of claim 1 wherein said signal processing means includes means for creating a signal having a frequency related to said carrier frequency and properly phased with respect to said beacon signal comprising phase lock loop circuit means for locking onto the frequency and phase of said beacon signal when a beacon is within range of said antenna means and sweep circuit means causing the frequency of said phase lock loop circuit means to gradually sweep up and down around a frequency related to said predetermined carried frequency when a beacon is not within range of said antenna means.

3. The keyless entry system of claim 1 wherein said frequency signal is a phase encoded radio frequency signal being transmitted at a single predetermined carrier frequency with the phase of the beacon signal shifted to distinguish between a logical "1" and a logical "0".

4. The keyless entry system of claim 3 wherein said antenna means is tuned to said predetermined carrier frequency to magnetically couple the energy of said beacon signal into said receiver means.

5. The keyless entry system of claim 1 wherein said beacon further includes a portable power source, motion sensing means for sensing physical motion of said beacon, and circuit means responsive to said motion sensing means for activating said transmitter means to transmit said beacon signal.

6. The keyless entry system of claim 1 wherein said predetermined rate is approximately every 1.5 cycles of the frequency beacon signal.

7. The keyless entry system of claim 5 wherein the circuitry in said beacon has a current drain on said portable power source in the microamp range when said beacon is stationary.

8. The keyless entry system of claim 1 wherein said beacon signal includes function information identifying the predetermined function to be performed by said receiver means.

9. The keyless entry system of claim 8 wherein said beacon signal comprises a digital code having a predetermined number of identification and function bits.

10. The keyless entry system of claim 9 wherein said beacon signal further includes an error correction code comprised of a number of bits equal to said predetermined number of identification and function bits.

11. The keyless entry system of claim 10 wherein said beacon signal is Miller encoded.

* * * * *